US012574601B2

(12) United States Patent
Mitsuhashi et al.

(10) Patent No.: US 12,574,601 B2
(45) Date of Patent: Mar. 10, 2026

(54) PROGRAM RECEIVING DISPLAY DEVICE AND PROGRAM RECEIVING DISPLAY CONTROL METHOD

(71) Applicant: INFOCITY, Inc., Tokyo (JP)

(72) Inventors: Takamichi Mitsuhashi, Tokyo (JP); Toshihide Hayashi, Tokyo (JP); Gota Iwanami, Tokyo (JP)

(73) Assignee: INFOCITY, Inc., Tokyo (JP)

( * ) Notice: Subject to any disclaimer, the term of this patent is extended or adjusted under 35 U.S.C. 154(b) by 0 days.

(21) Appl. No.: 18/729,816

(22) PCT Filed: Jan. 10, 2023

(86) PCT No.: PCT/JP2023/000337
§ 371 (c)(1),
(2) Date: Jul. 17, 2024

(87) PCT Pub. No.: WO2023/136241
PCT Pub. Date: Jul. 20, 2023

(65) Prior Publication Data
US 2025/0097534 A1 Mar. 20, 2025

(30) Foreign Application Priority Data
Jan. 17, 2022 (JP) ................................. 2022-005225

(51) Int. Cl.
*H04N 21/472* (2011.01)
*H04N 21/2387* (2011.01)
*H04N 21/462* (2011.01)

(52) U.S. Cl.
CPC ... *H04N 21/47202* (2013.01); *H04N 21/2387* (2013.01); *H04N 21/462* (2013.01)

(58) Field of Classification Search
CPC ......... H04N 21/47202; H04N 21/2387; H04N 21/462; H04N 7/17318; H04N 21/431;
(Continued)

(56) References Cited

U.S. PATENT DOCUMENTS 9,292,174 B1* 3/2016 Nijim ................. H04N 21/4882
10,003,849 B1* 6/2018 Killick ............... H04N 21/8547
(Continued)

FOREIGN PATENT DOCUMENTS

JP 2006517757 A 7/2006
JP 2007013358 A 1/2007
(Continued)

OTHER PUBLICATIONS

International Search Report issued in International Application No. PCT/JP2023/000337, mailed Mar. 14, 2023 (5 pages).
(Continued)

*Primary Examiner* — Fernando Alcon
(74) *Attorney, Agent, or Firm* — Osha Bergman Watanabe & Burton LLP

(57) ABSTRACT

The present invention is a program receiving display device adapted for a digital broadcasting service and an IPTV service, comprising: a first program stream acquisition unit that acquires a first program stream that constitutes a program content, based on a broadcast signal from a station selected according to a channel number from received broadcast waves; a second program stream acquisition unit that requests distribution of a second program stream, which is equivalent to the first program stream, via a communication network to a specific distribution server according to link information associated with the channel number and that acquires the second program stream distributed from the specific distribution server in response to the request; and a main control unit that performs control to select at least one of the first program stream or the second program stream, and to display the program content based on the selected program stream on a screen.

14 Claims, 18 Drawing Sheets

(58) Field of Classification Search

CPC ............. H04N 21/4622; H04N 21/472; H04N 21/6125; H04N 21/4383; H04N 21/4263; H04N 21/4312

See application file for complete search history.

(56) References Cited

U.S. PATENT DOCUMENTS

| | | | | |
|---|---|---|---|---|
| 11,317,155 | B1 * | 4/2022 | Brasch | H04N 21/6587 |
| 11,490,159 | B2 * | 11/2022 | Dhiman | H04N 21/231 |
| 2004/0052504 | A1 * | 3/2004 | Yamada | H04N 21/43637 |
| | | | | 386/234 |
| 2004/0158870 | A1 | 8/2004 | Paxton et al. | |
| 2007/0003215 | A1 | 1/2007 | Ito et al. | |
| 2007/0130597 | A1 * | 6/2007 | Parker | H04N 5/76 |
| | | | | 348/E7.071 |
| 2007/0265966 | A1 * | 11/2007 | Kahn | H04N 21/44209 |
| | | | | 348/E7.06 |
| 2008/0163320 | A1 * | 7/2008 | Chen | H04N 21/25841 |
| | | | | 725/112 |
| 2009/0147140 | A1 * | 6/2009 | Kim | H04N 21/4383 |
| | | | | 348/565 |
| 2009/0269025 | A1 * | 10/2009 | Bedingfield, Sr. | ............ |
| | | | | H04N 21/4622 |
| | | | | 386/E5.005 |
| 2012/0210343 | A1 * | 8/2012 | McCoy | H04N 21/25875 |
| | | | | 725/109 |
| 2018/0139489 | A1 | 5/2018 | Hirano et al. | |
| 2018/0176646 | A1 * | 6/2018 | Kum | H04N 21/4826 |
| 2019/0014378 | A1 * | 1/2019 | Shah | H04N 21/47217 |
| 2022/0078499 | A1 * | 3/2022 | Wolan, II | H04N 21/8455 |

FOREIGN PATENT DOCUMENTS

| | | | | |
|---|---|---|---|---|
| JP | 2020108067 A | 7/2020 | | |
| JP | 2020150565 A | 9/2020 | | |
| JP | 2021057690 A | 4/2021 | | |
| WO | WO-2017081059 A1 * | 5/2017 | ....... | H04N 21/47202 |

OTHER PUBLICATIONS

Written Opinion issued in International Application No. PCT/JP2023/000337; Dated Mar. 14, 2023 (4 pages).

International Preliminary Report on Patentability issued in International Application No. PCT/JP2023/000337; mailed Feb. 22, 2024 (8 pages).

* cited by examiner

FIG. 3

| CHANNEL ID |
|---|
| PROGRAM ID |
| TRANSMISSION TIME |
| EPG FORMAT : |
| EVENT PERIOD |
| PROGRAM NAME |
| PROGRAM DESCRIPTION |
| : |
|  |

*FIG. 5*

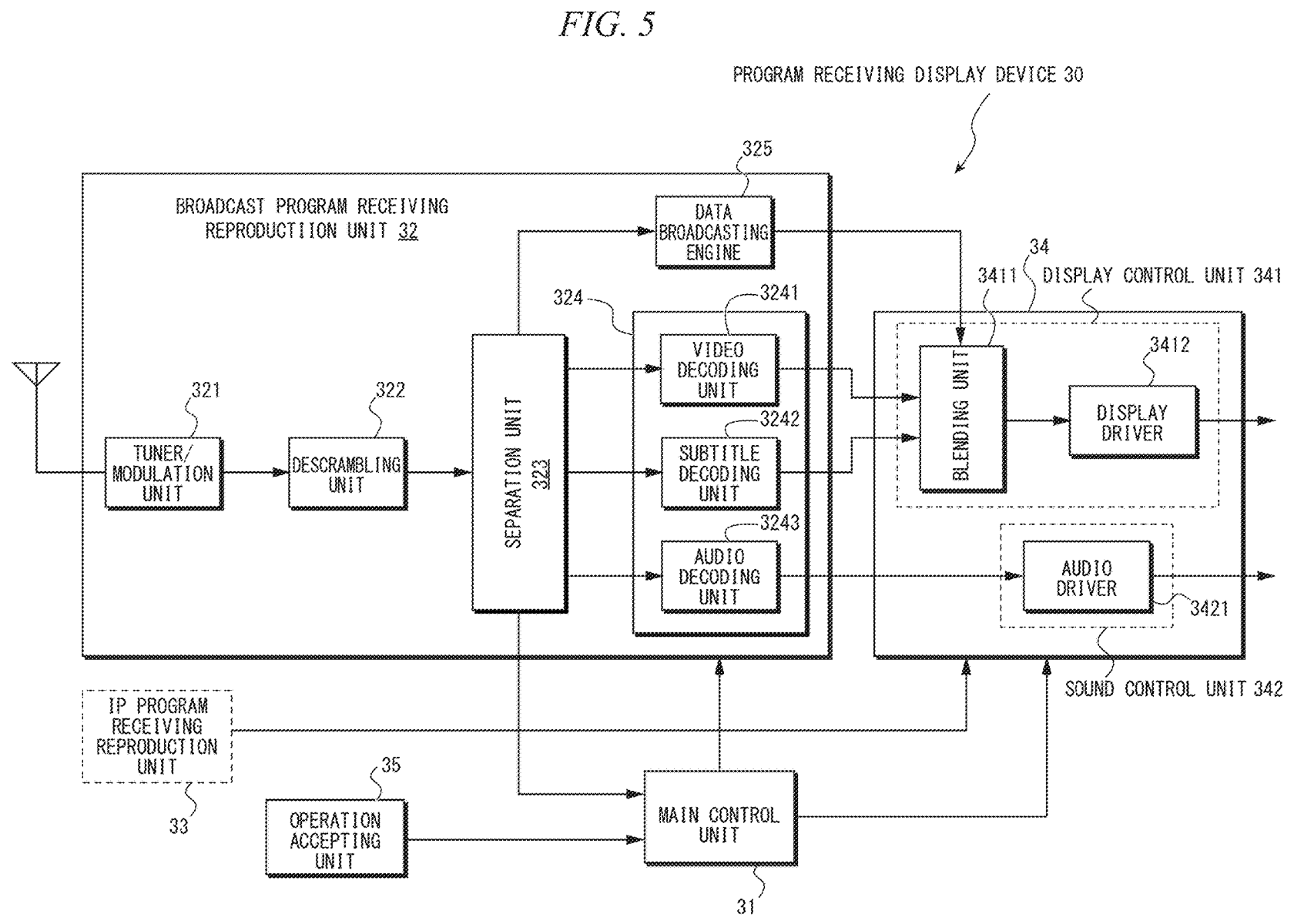

PROGRAM RECEIVING DISPLAY DEVICE 30

DISPLAY CONTROL UNIT 341

3412

DISPLAY DRIVER

3411

BLENDING UNIT

34

SOUND CONTROL UNIT 342

3421

AUDIO DRIVER

325

DATA BROADCASTING ENGINE

324

3241

VIDEO DECODING UNIT

3242

SUBTITLE DECODING UNIT

3243

AUDIO DECODING UNIT

323

SEPARATION UNIT

322

DESCRAMBLING UNIT

321

TUNER/ MODULATION UNIT

BROADCAST PROGRAM RECEIVING REPRODUCTION UNIT 32

31

MAIN CONTROL UNIT

35

OPERATION ACCEPTING UNIT

33

IP PROGRAM RECEIVING REPRODUCTION UNIT

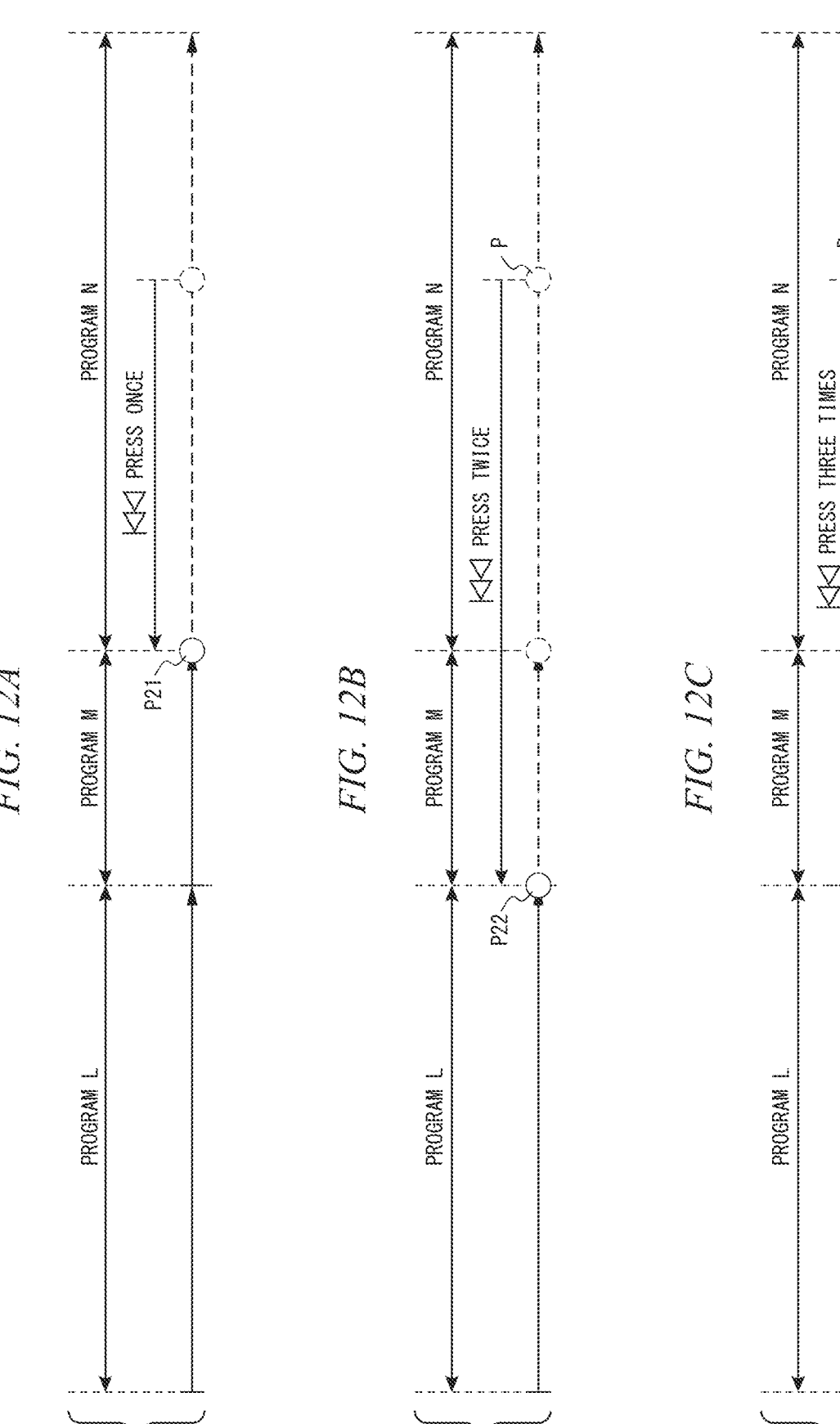

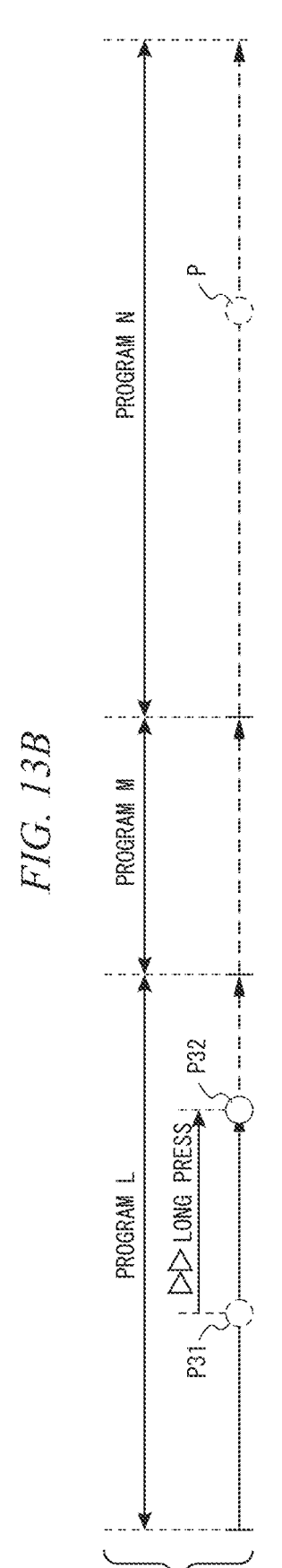
*FIG. 13A*
*FIG. 13B*
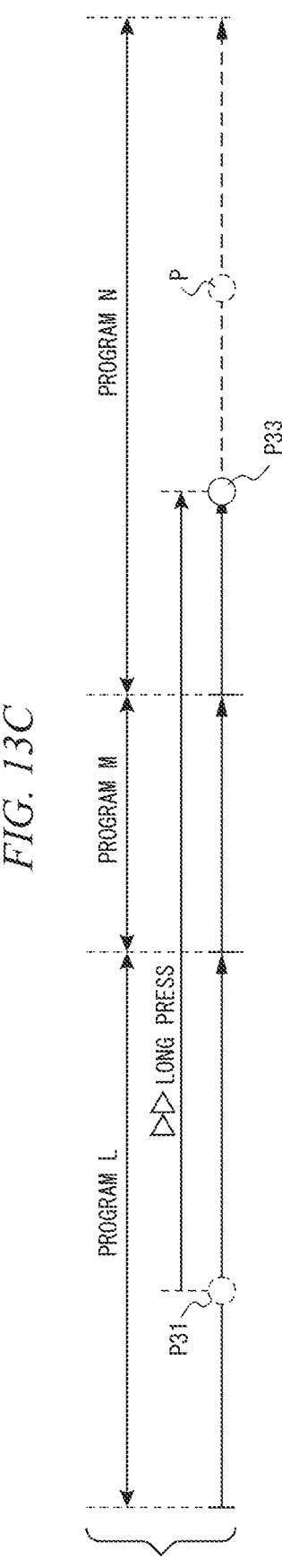
*FIG. 13C*

PROGRAM RECEIVING DISPLAY DEVICE AND PROGRAM RECEIVING DISPLAY CONTROL METHOD

TECHNICAL FIELD

The present invention relates to a program receiving display device and a program receiving display control method.

BACKGROUND ART

Digital television broadcasting services have conventionally been widely used around the world, wherein viewers receive broadcast waves sent from radio towers and other facilities by means of program receiving display devices, such as television receivers, and watch program content from a station selected from the broadcast waves. In addition, the digital television broadcasting services provide program content related to data broadcasting associated with program content (main program content) broadcast in actual time in a linked manner to the main program content.

There has been increasing popularity of IPTV services (sometimes referred to as "Internet broadcasting services"), wherein viewers watch, on information communication terminal devices, such as smartphones, program content that is streamed or distributed through communication networks, such as IP networks, from an Internet Service Provider (ISP) or Content Delivery Network (CDN) provider. For example, an IP broadcasting service is a service based on the concept of channels in which programs are scheduled along a time axis as with the conventional television services, and such IP broadcasting service allows program content on various channels to be watched using communication networks.

Moreover, in recent years, a so-called simultaneous program distribution service is being offered in which broadcasting stations simultaneously distribute program content being aired with broadcast waves also with the IPTV services. Therefore, several program receiving display devices have been proposed to be adapted for both the television broadcasting services and the IPTV services.

For example, Patent Literature 1 below discloses an uplink device that quickly ensures broadcast viewing when the broadcast reception becomes unavailable. This uplink device comprises: a simultaneous distribution receiving unit which receives a simultaneous distribution signal distributed simultaneously via the Internet, while the broadcast is not receivable; a re-coding unit which re-codes the simultaneous distribution signal in accordance with a method based on a television broadcasting coding method; and a transmission unit which generates a modulated signal by modulating a signal re-coded by the re-coding unit and transmits a signal based on the modulated signal to a re-broadcasting device.

Further, Patent Literature 2 below discloses a broadcasting receiver that can perform simultaneous viewing and recording operations in an environment that receives both radio wave broadcasting and IP broadcasting. This broadcasting receiver includes a viewing/recording management unit and a viewing/recording path selection unit. The viewing/recording management unit performs control and selection to cause a tuner unit and a communication interface unit to respectively receive radio wave broadcasts and IP broadcasts that are broadcast from the same broadcaster on the basis of information for selecting the same broadcaster. Based on the information on the radio wave broadcasts and IP broadcasts, the viewing/recording path selection unit outputs one of the broadcasts onto a signal path leading to an image/audio output unit that outputs images and audio, and outputs the other of the broadcasts onto a signal path leading to a stream accumulation unit that accumulates image and audio signals.

CITATION LIST

Patent Literature

Patent Literature 1: Japanese Patent Publication No. 2020-108067
Patent Literature 2: Japanese Patent Publication No. 2021-57690

SUMMARY OF INVENTION

Technical Problem

In recent years, as there has been an acceleration in the so-called "loss of interest in television" among young people in particular, it has become an urgent issue for broadcasters to secure opportunities for as many viewers as possible to come into contact with program content. The IP broadcasting service makes it possible to provide program content to viewers through information communication terminal devices, such as smartphones, that do not have the function of receiving the broadcast waves and selecting channels therefrom, and further spread of the simultaneous program distribution services by means of the conventional broadcastings and IP broadcastings is expected.

In addition, more viewers may be secured if a new watching style can be made appealing to viewers by means of a program receiving display device, such as a television receiver.

However, while the spread of simultaneous program distribution services has progressed, there are in fact only a few applications proposed, such as those disclosed in Patent Literatures 1 and 2, and they are not necessarily sufficient to provide viewers with a new watching style that takes advantage of the characteristics of simultaneous program distribution services.

Further, in the digital broadcasting services, since program content related to data broadcasting is linked to the actual-time main program content, viewers cannot enjoy the provision of program content related to data broadcasting during playback of recordings, such as so-called "time-shifted reproduction."

Accordingly, an object of the present invention is to provide a program receiving display device and program receiving display control method that can provide a new watching style different from the conventional digital television broadcasting service by effectively utilizing the simultaneous program distribution service.

Solution to Problem

The present invention for solving the above-described problems is configured to include the matters specifying the invention or technical features indicated below.

More specifically, the present invention according to an aspect is a program receiving display device adapted for a digital broadcasting service and an IPTV service. The program receiving display device comprises: a first program stream acquisition unit that acquires a first program stream based on a broadcast signal from a station selected according to a channel number from received broadcast waves; a second program stream acquisition unit that sends a distribution request of a second program stream to a distribution server according to specific link information and acquires the second program stream distributed from the distribution server in response to the distribution request; and a main control unit that performs control to select at least one of the first program stream or the second program stream, and to display a program content configured based on the selected program stream on a screen.

The main control unit may switch to at least one of a first operational mode or a second operational mode, according to an operation of a viewer. In addition, the main control unit may select the first program stream in the first operational mode, and the second program stream in the second operational mode.

In addition, the second program stream acquisition unit may acquire the program stream corresponding to the program content for a current channel number. Alternatively, the second program stream acquisition unit may acquire the program stream of another program content in a distribution time zone different from a distribution time zone of the program content for the current channel number.

In addition, the main control unit may perform control, in the first operational mode, to display the program content based on the first program stream on the screen at a reproduction position in actual time on a time axis. The main control unit may also perform control, in the second operational mode, to display the program content based on the second program stream on the screen at a reproduction position at a point of time in the past on the time axis.

In addition, the main control unit may perform control, in the second operational mode, to display the program content based on the second program stream on the screen at a reproduction speed different from a reproduction speed in the actual time.

Further, in the case where the reproduction position of the program content at a point of time in the past reaches a reproduction position in the actual time, the main control unit may switch to the first operational mode.

In the case where a channel number different from the current channel number is selected, the main control unit may also switch to the first operational mode.

In addition, the second program stream acquisition unit acquires the second program stream from a point of time in the past identified according to the viewer's operation, in accordance with the specific link information associated with the program content.

The main control unit may also switch to a third operational mode according to the viewer's operation. The main control unit may perform control, in the third operational mode, to display the program content based on the first program stream in a first frame in the screen at a reproduction position in actual time, and to display the program content based on the second program stream in a second frame, different from the first frame, at a reproduction position at a point of time in the past.

In addition, the main control unit may perform control, in the second operational mode, to superimpose an indicator indicating the IPTV service on the program content based on the selected second program stream.

The second program stream acquisition unit may also send a VOD distribution request and receive the second program stream streamed by unicast from the distribution server in response to the VOD distribution request. Thereby, the main control unit may perform control to display the program content based on the second program stream in the VOD distribution service on the screen.

Further, the second program stream acquisition unit may send an IP distribution request in lieu of the VOD distribution request, in the case where a reproduction position of the program content based on the second program stream reaches a reproduction position in actual time, and receive the second program stream streamed by multicast from the distribution server in response to the IP distribution request. Thereby, the main control unit may perform control to display the program content based on the second program stream in the IP distribution service on the screen.

Moreover, the present invention according to another aspect is a program receiving display control method by a program receiving display device adapted for a digital broadcasting service and an IPTV service. The program receiving display control method comprises: acquiring a first program stream based on a broadcast signal from a station selected according to a channel number from received broadcast waves; sending a distribution request of a second program stream to a distribution server indicated by specific link information and acquiring the second program stream distributed from the distribution server in response to the distribution request; and performing control to select at least one of the first program stream or the second program stream and to display a program content configured based on the selected program stream on a screen. The performing control selects the first program stream in the first operational mode, and at least the second program stream in the second operational mode.

Further, the present invention may also be understood as an invention related to a computer program for causing a computer system to carry out the above-described method or to a non-transitory computer readable recording medium in which such computer program is recorded thereon.

In the present disclosure, the term "means" does not merely mean a physical means but also encompasses the case where the functions of such means are achieved by software. In addition, a function of one means may be achieved by two or more physical means, and functions of two or more means may be achieved by one physical means.

Further, in the present disclosure, the term "system" includes an ensemble where multiple devices (or functional modules achieving specific functions) are logically assembled, regardless of whether each device or functional module is physically configured as a single entity or a separate entity.

Advantageous Effect of Invention

According to the present invention, the simultaneous program distribution service will be effectively utilized and viewers will be able to enjoy a new watching style different from the conventional digital television broadcasting service.

Other technical features, objects, effects, or advantages of the present invention will become apparent by the following embodiments described with reference to the attached drawings.

5

6

FIG. 3 is a diagram showing an example of a data structure of EPG information applied to the program provision service according to an embodiment of the present invention.

Figure 4:
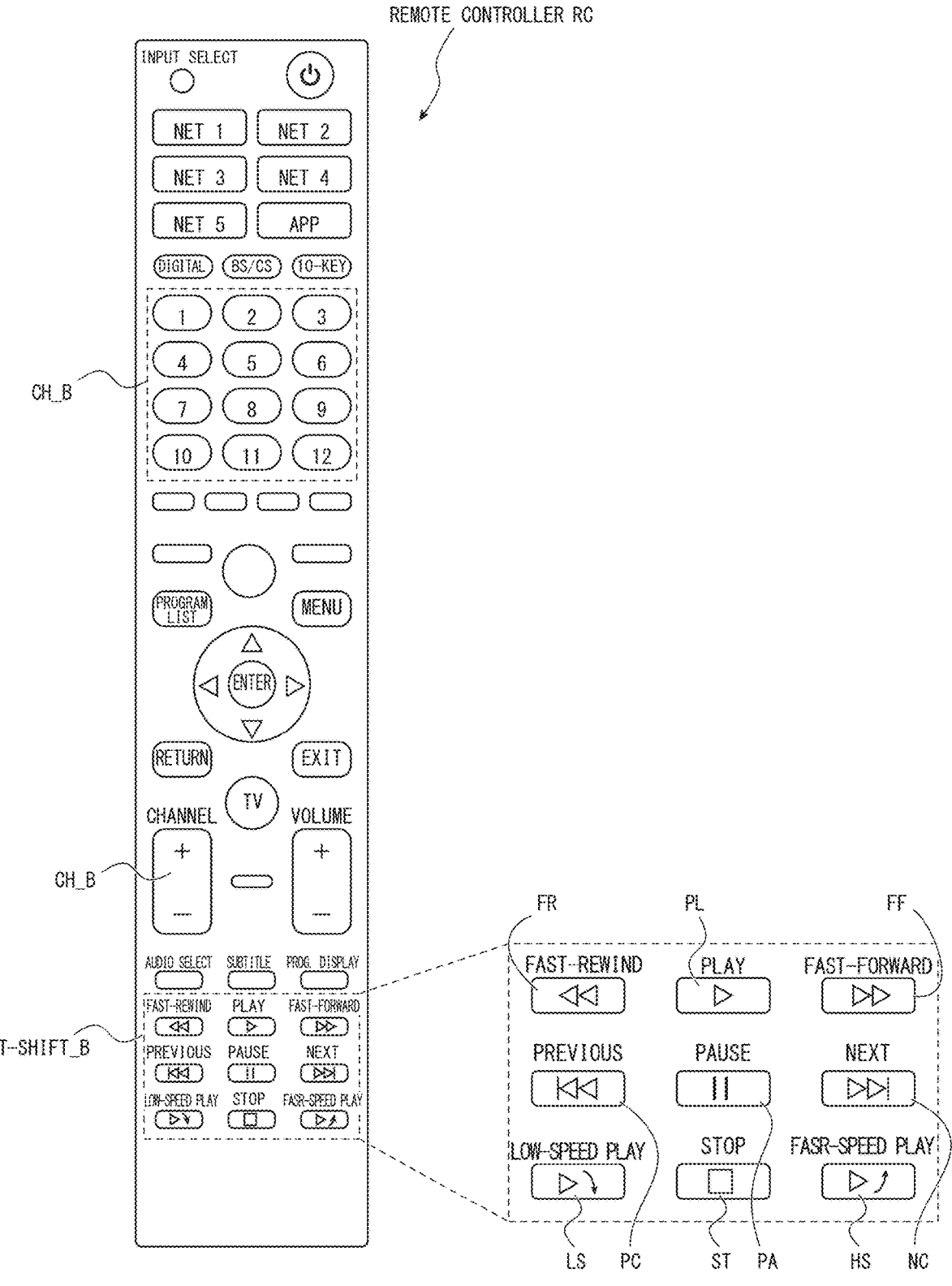

FIG. 4 is a diagram showing an example of a remote controller adapted for a program receiving display device according to an embodiment of the present invention.

FIG. 5 is a block diagram for providing a detailed description of a configuration of a broadcast program receiving reproduction unit of a program receiving display device according to an embodiment of the present invention.

Figure 6:
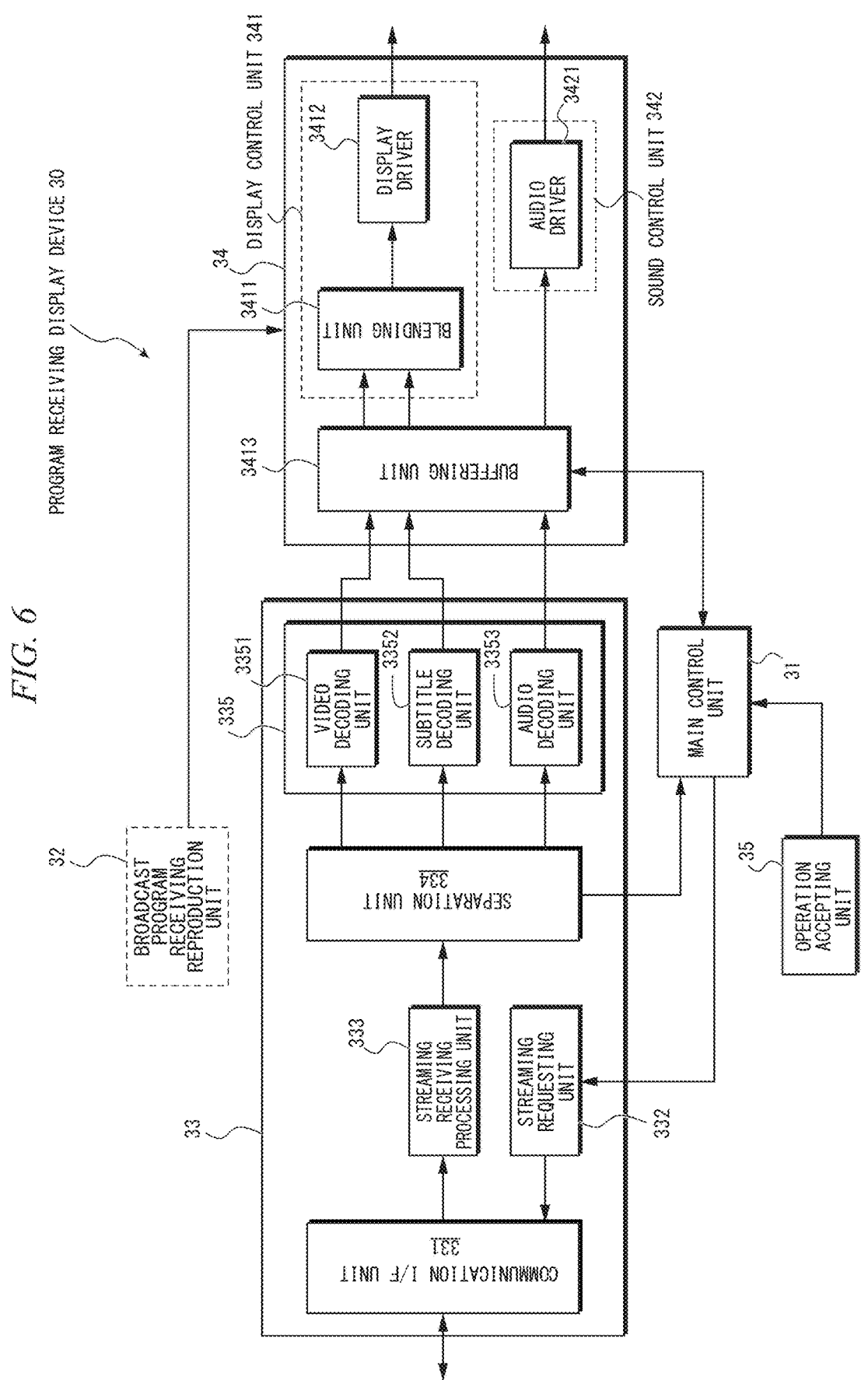

FIG. 6 is a block diagram for providing a detailed description of a configuration of an IPTV program receiving reproduction unit of a program receiving display device according to an embodiment of the present invention.

Figure 7:
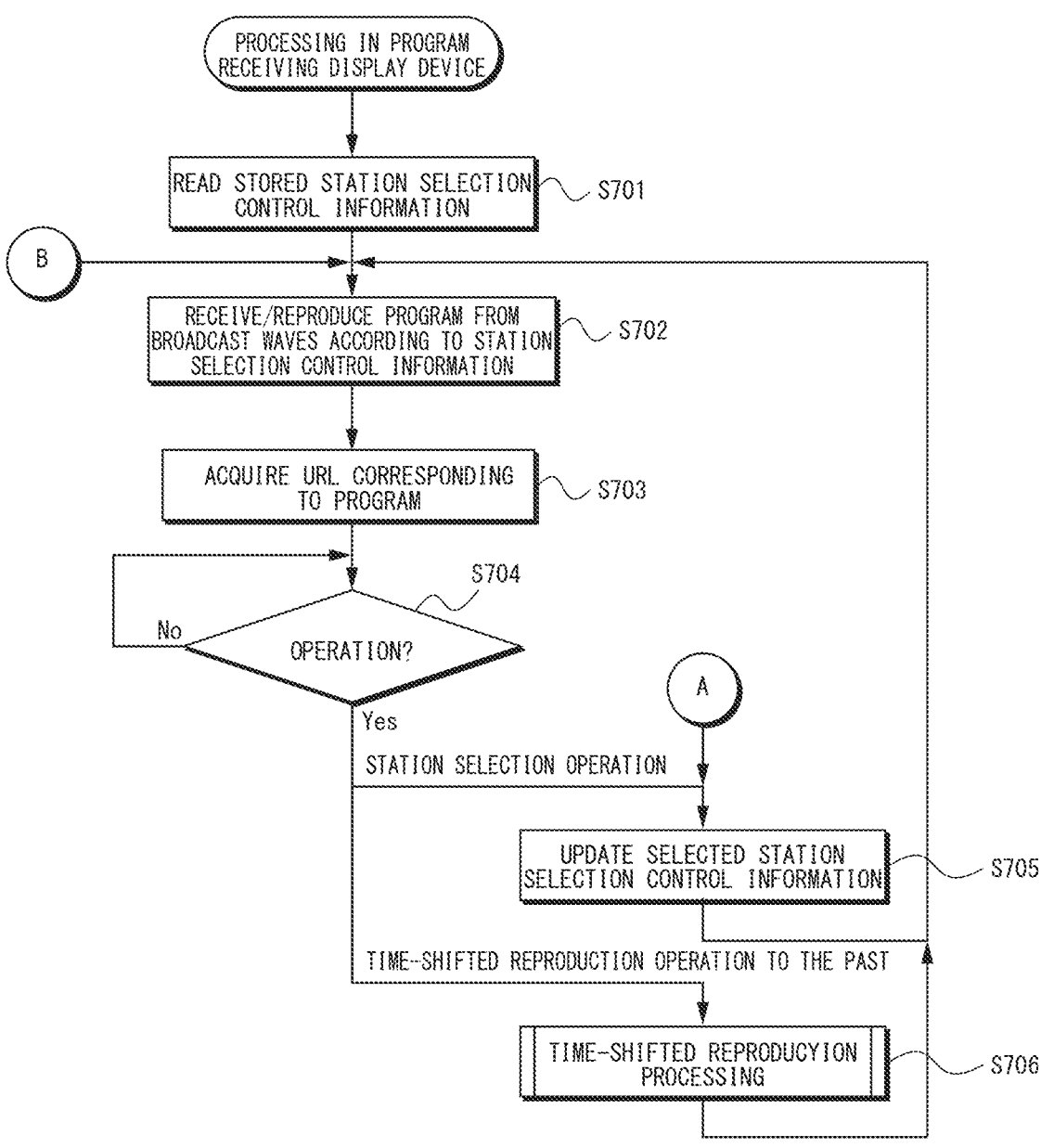

FIG. 7 is a flowchart showing an example of operations of a program receiving display device according to an embodiment of the present invention.

Figure 8:
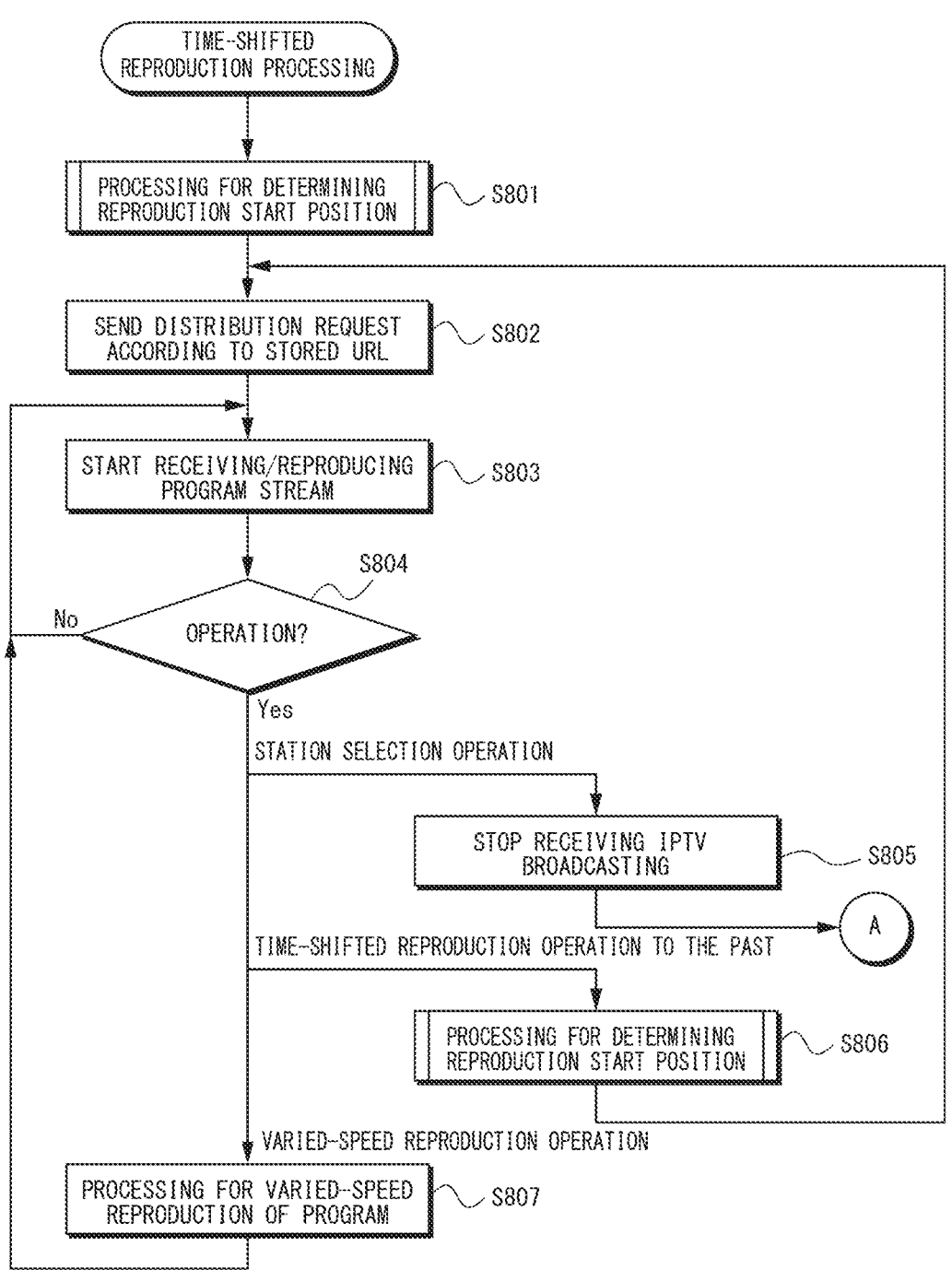

FIG. 8 is a flowchart showing an example of time-shifted reproduction processing performed by a program receiving display device according to an embodiment of the present invention.

Figure 9:
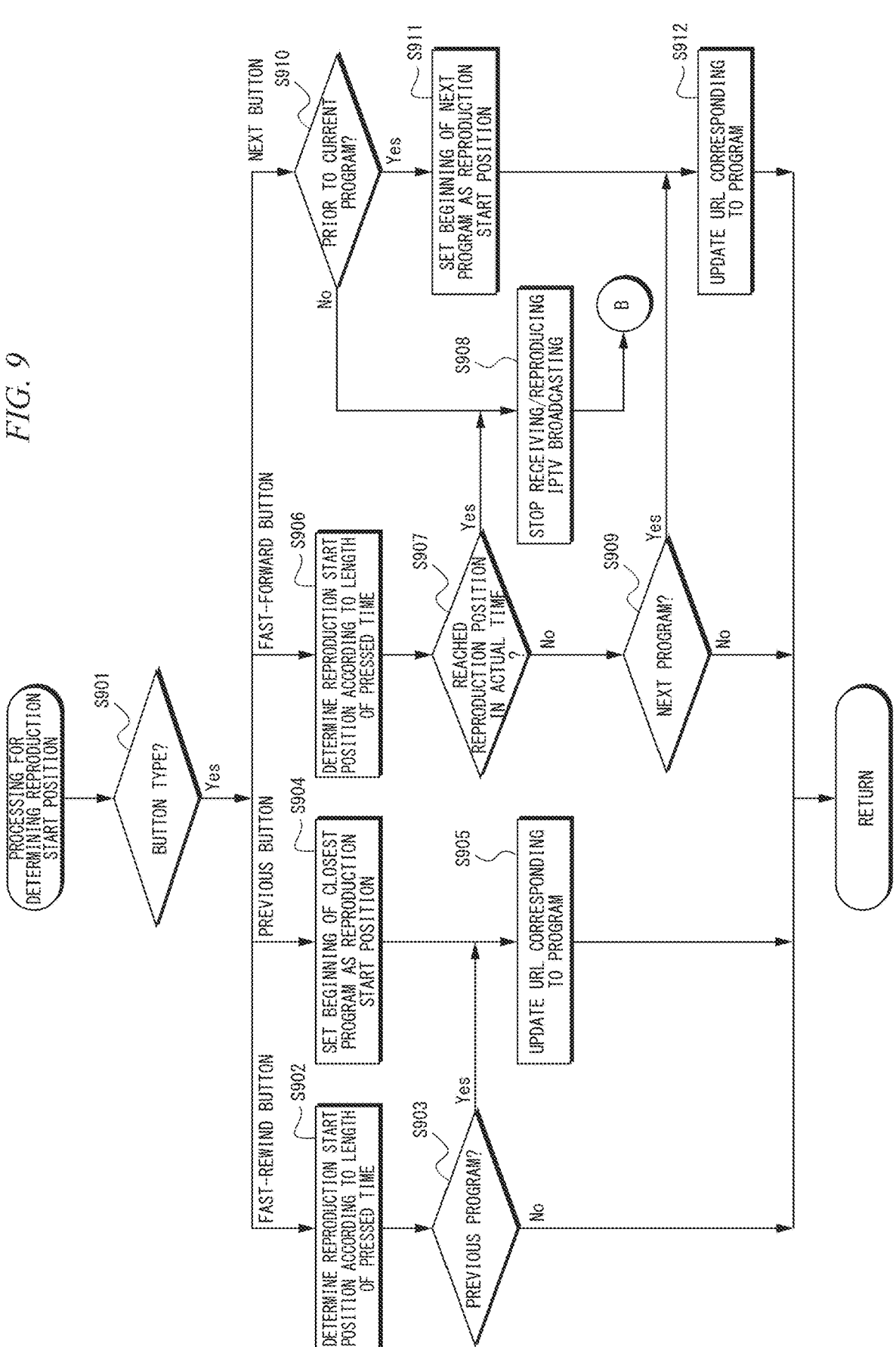

FIG. 9 is a flowchart showing an example of time-shifted reproduction processing performed by a program receiving display device according to an embodiment of the present invention.

Figure 10:
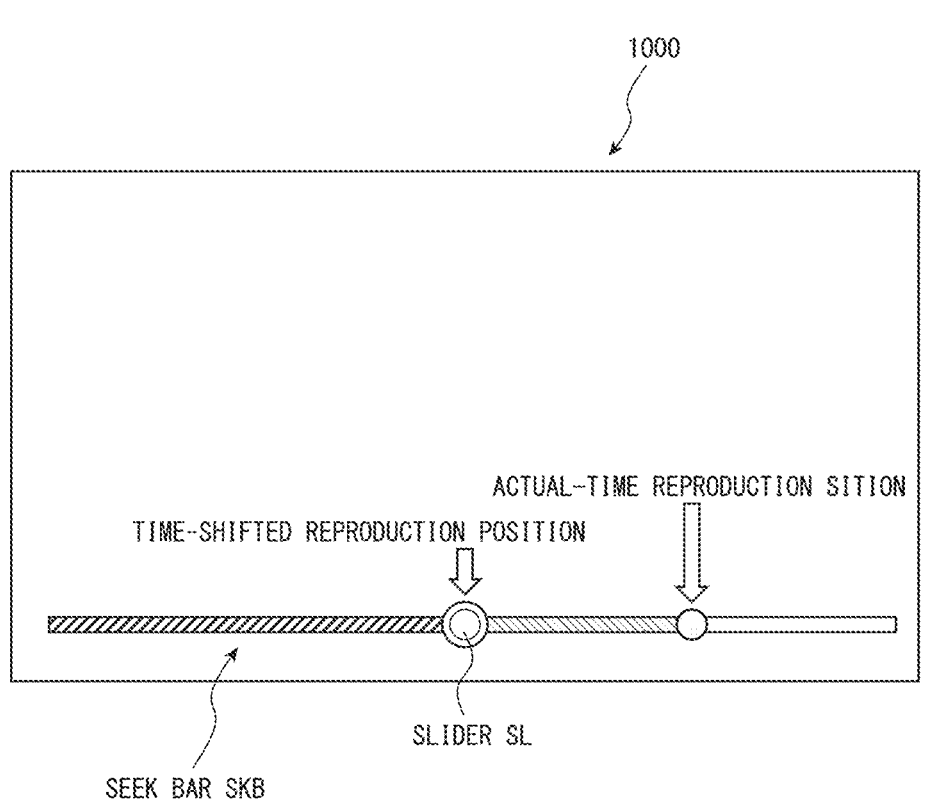

FIG. 10 is a diagram for describing an example of a screen displayed on a program receiving display device according to an embodiment of the present invention.

Figures 11A, 11B, 11C:
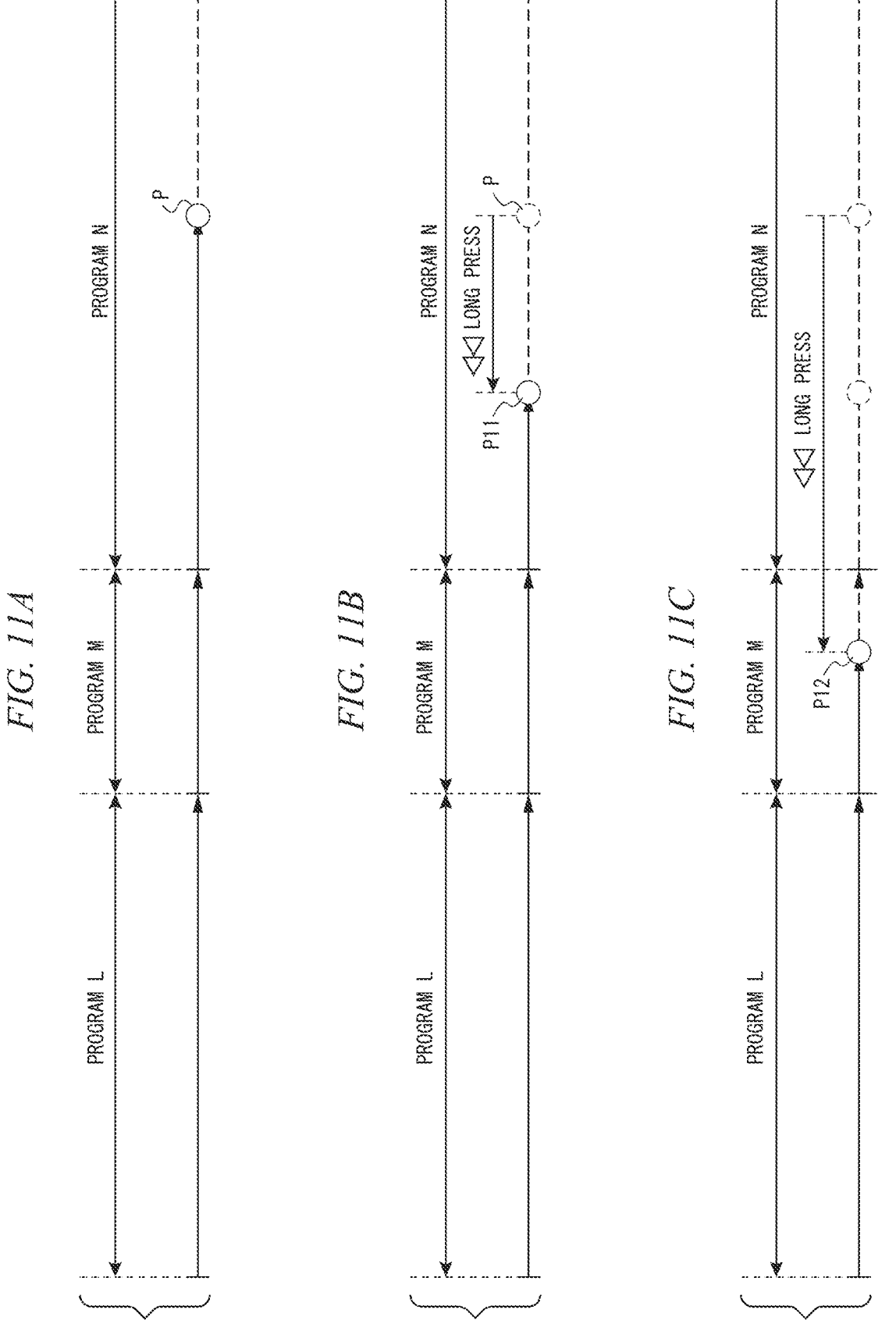

FIGS. 11A-11C are diagrams for describing examples of time-shifted reproduction through a fast-rewind operation performed on a program receiving display device according to an embodiment of the present invention.

FIGS. 12A-12C are diagrams for describing examples of time-shifted reproduction through a fast-rewind operation performed on a program receiving display device according to an embodiment of the present invention.

FIGS. 13A-13C are diagrams for describing examples of time-shifted reproduction through a fast-forward operation performed on a program receiving display device according to an embodiment of the present invention.

Figures 14A, 14B:
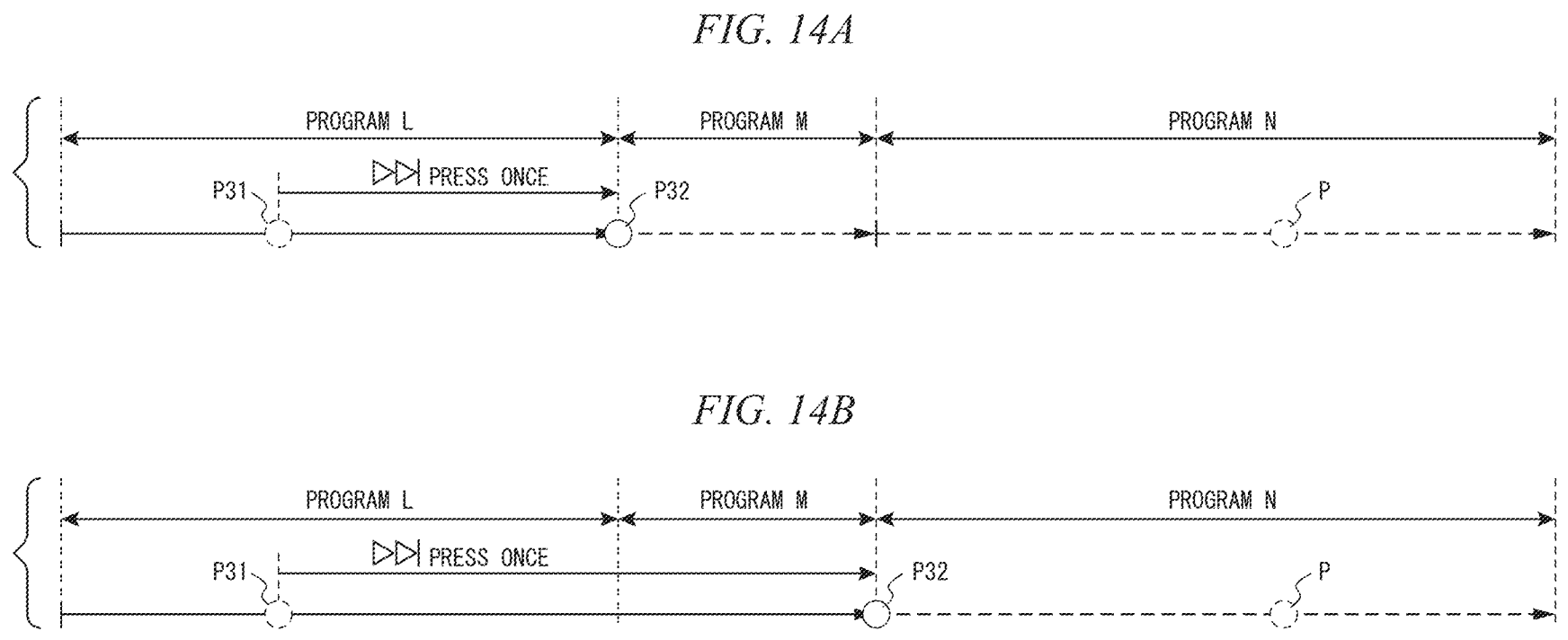

FIGS. 14A and 14B are diagrams for describing examples of time-shifted reproduction through a "next-program" operation performed on a program receiving display device according to an embodiment of the present invention.

Figure 15:
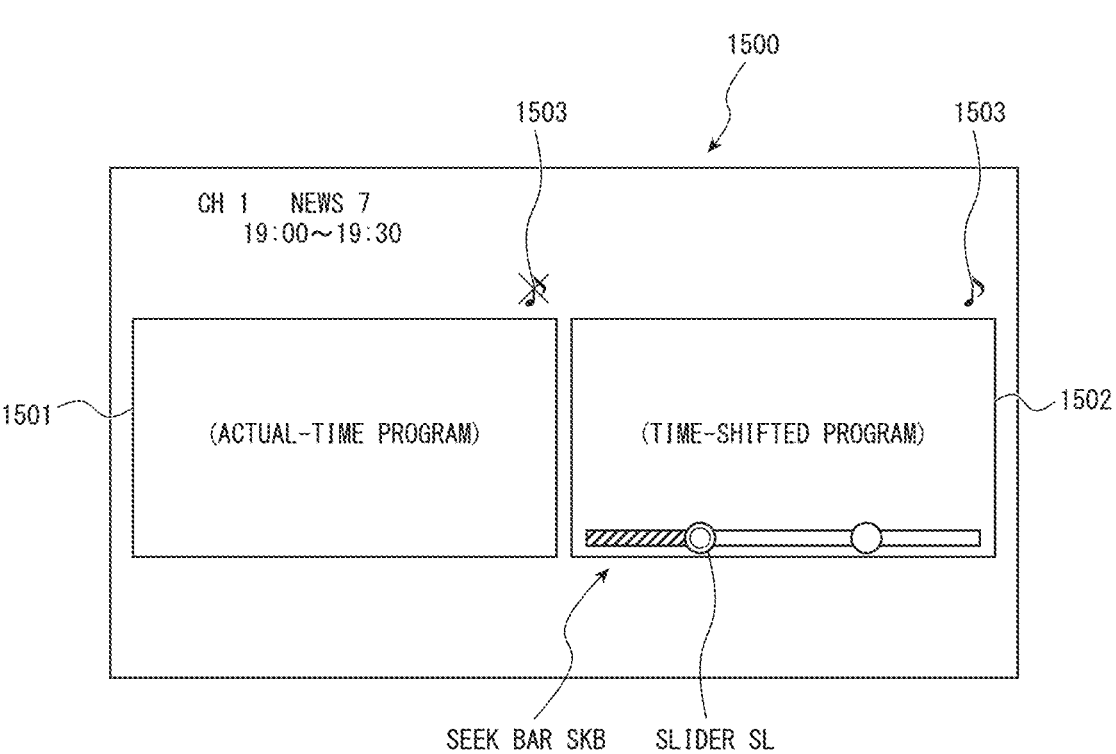

FIG. 15 is a diagram for describing an example of a screen displayed on a program receiving display device according to an embodiment of the present invention.

Figure 16:
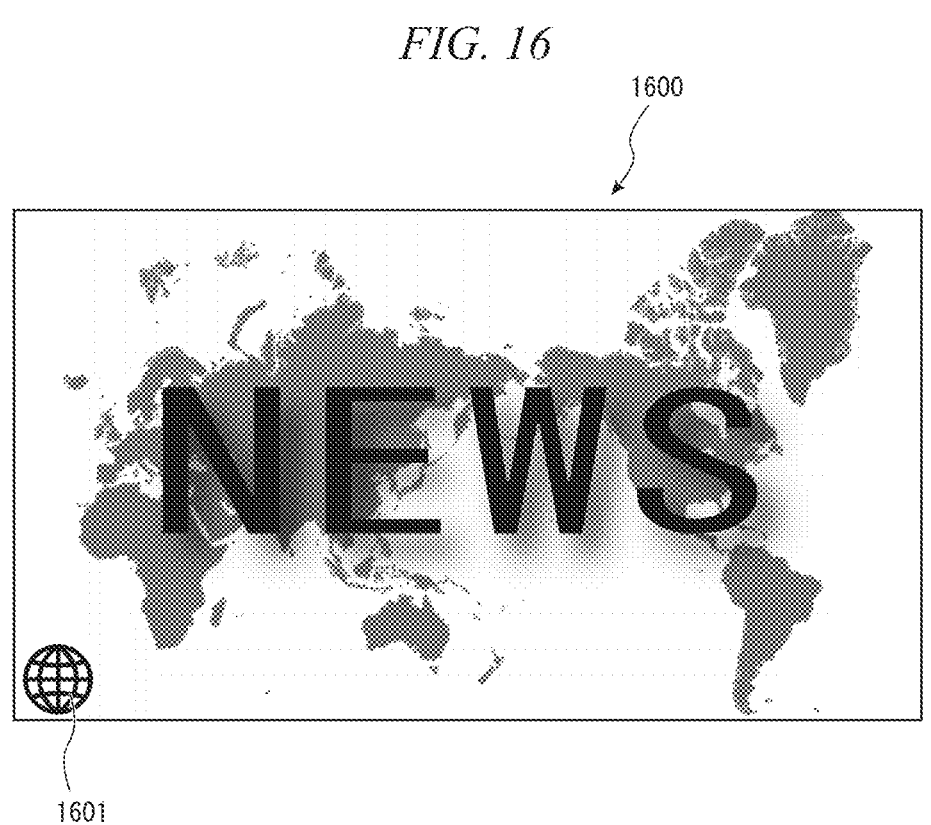

FIG. 16 is a diagram for describing an example of a screen displayed on a program receiving display device according to an embodiment of the present invention.

Figure 17:
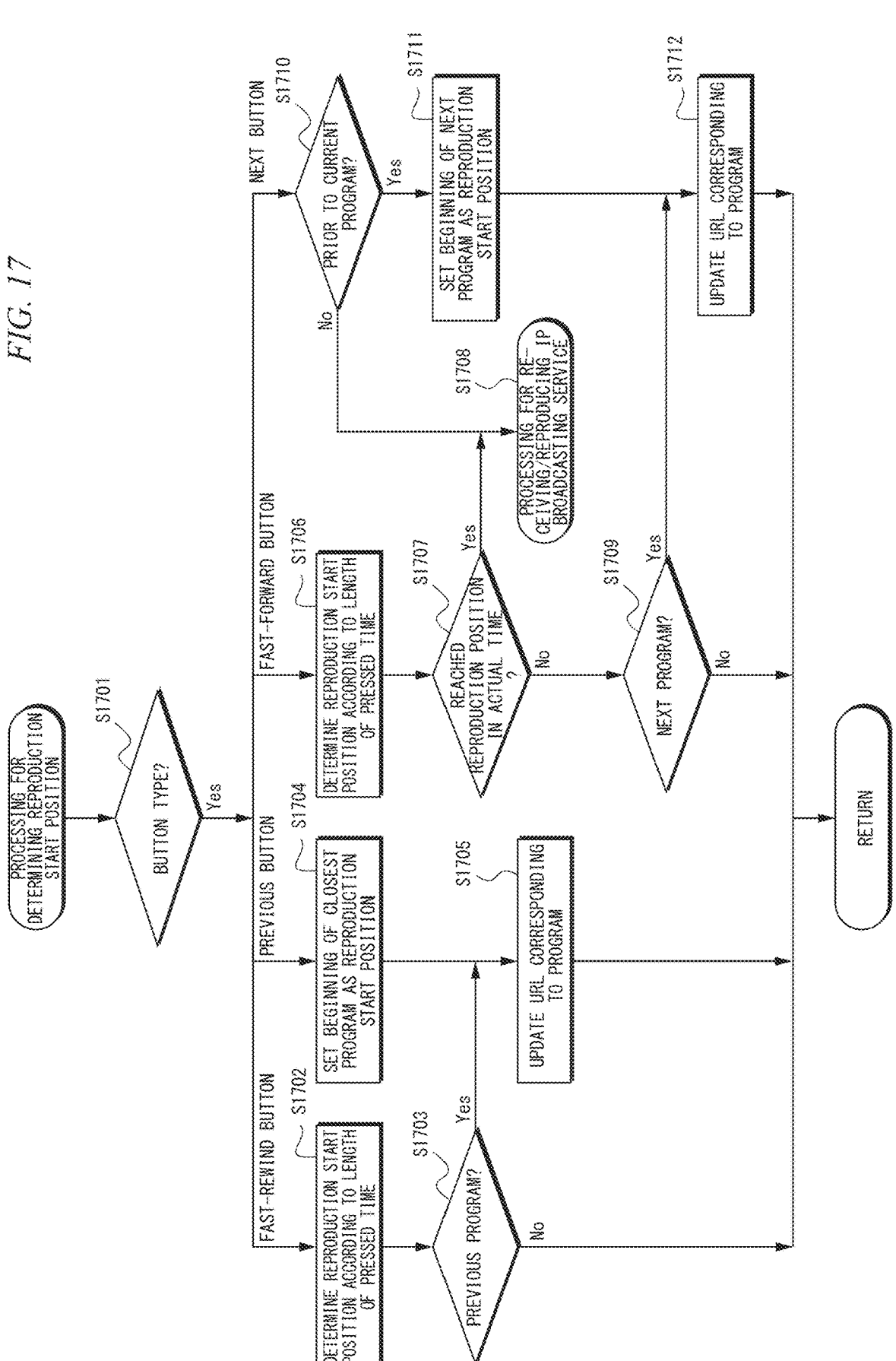

FIG. 17 is a flowchart showing an example of time-shifted reproduction processing performed by a program receiving display device according to an embodiment of the present invention.

Figure 18:
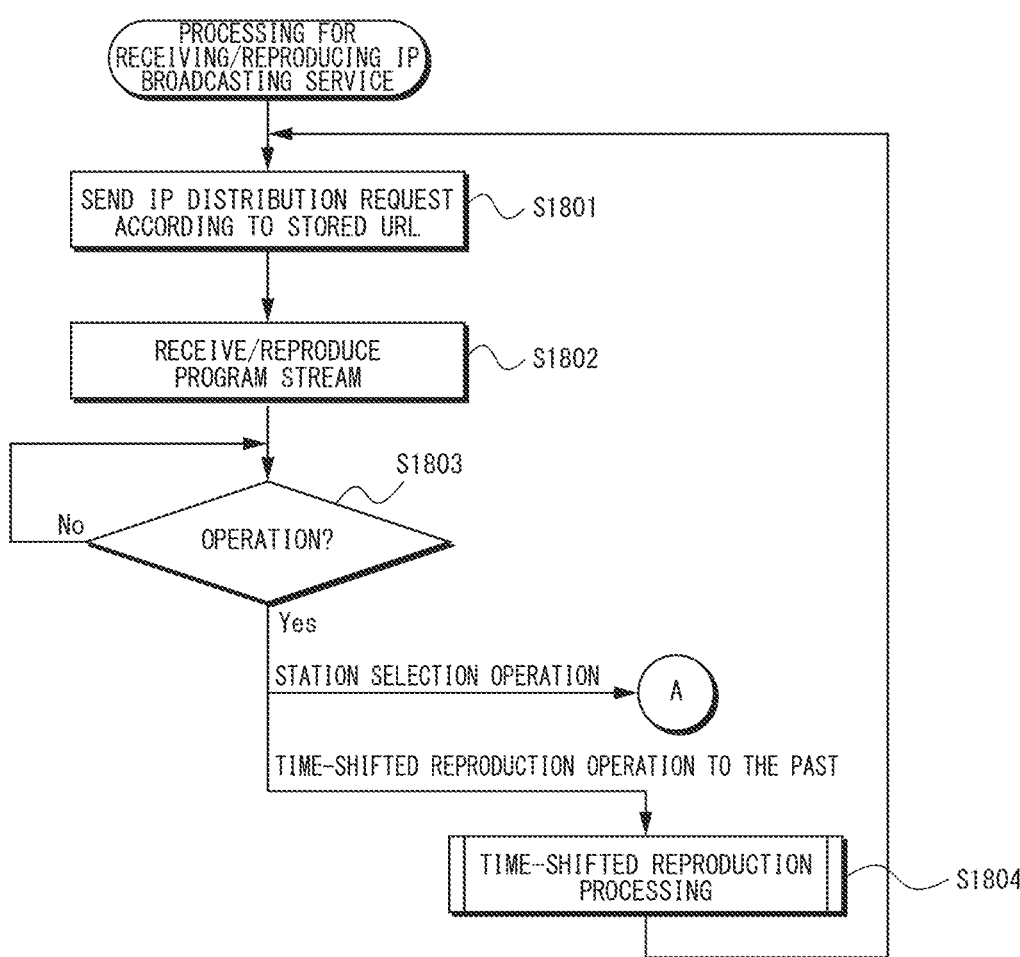

FIG. 18 is a flowchart showing an example of reception/reproduction processing of program content in an IP broadcasting service performed by a program receiving display device according to an embodiment of the present invention.

DESCRIPTION OF EMBODIMENTS

Embodiments of the present invention will be described below with reference to the drawings. However, the embodiments described below are only illustrations, and there is no intention to exclude the application of various variations or technologies not expressly stated below. The present invention may be implemented with various variations (e.g., by combining each embodiment) without departing from its spirit. In addition, the same or similar parts will be denoted with the same or similar references in the following descriptions of the drawings. The drawings are schematic and do not necessarily correspond to the actual dimensions or ratios. Parts may also be included wherein the dimensional relationship or ratio between each other is different among the drawings.

First Embodiment

The present embodiment is characterized in that, in the case where a viewer (user) who is watching a program broadcast in actual time by a digital broadcasting service selects time-shifted reproduction (playback) of the program, the time-shifted reproduction of the program is enabled by switching to an IPTV service that achieves a simultaneous program distribution service. Before providing the detailed description of the present embodiment, the meanings of the key terms used in the present disclosure will be provided below. The meanings of other terms will be described in the text as necessary.

The term "digital broadcasting service" refers to the conventional digital television broadcasting service in which broadcasters provide programs to viewers in actual time using various broadcasting technologies. A terrestrial digital broadcasting service, a satellite broadcasting service, such as a so-called BS broadcasting service using a broadcasting satellite S and/or a CS broadcasting service using a communication satellite, and a cable television broadcasting service using an optical cable (not shown), and the like, are some known examples of the digital broadcasting service.

The term "IPTV service" refers to a service in which programs are streamed or distributed (hereinafter simply referred to as "distributed" as long as no distinction is necessary) over an Internet Protocol (IP)-based network, and is technically differentiated from the conventional digital broadcasting service. The IPTV service may include a content distribution service in the form of, for example, a VOD (distribution) service, a download service, and an IP broadcasting service (including an IP distribution service and an IP retransmission service).

The term "VOD distribution service" refers to a service in the form of directly receiving/reproducing streamed content from a content server based on request operations made from viewers. Typically, in the VOD distribution service, a content server (distribution server) may distribute the streaming by unicast from the beginning or a designated position of the content.

The term "IP broadcasting service" refers to a broadcasting-type service based on the concept of channels in which programs are scheduled along a time axis. In the IP broadcasting service, streaming may be transmitted by multicast through a distribution server. However, even with the IP broadcasting service, any content may be streamed from the beginning or a predetermined position of the content.

The term "simultaneous program distribution service" refers to a service in which the same program as the program broadcast in actual time by the digital broadcasting service is also distributed with the IPTV service in actual time. In a case where we consider the digital broadcasting service provided by broadcasters as the main service, the simultaneous program distribution service may be considered as a subsidiary service. In addition, in the present disclosure, the simultaneous program distribution service may include an extended program distribution service that realizes time-shifted reproduction of programs in the IPTV service.

The term "program" refers to a unit scheduled along a time axis for broadcasting or distribution. The term "broadcast program" refers to a program provided by the digital broadcasting service, and the term "IPTV program" refers to a program provided by the IPTV service.

The term "program content" is used to refer to a package of information that constitutes the content of a program. However, depending on the context, "program", "program content" and "content" may be used interchangeably. Program content may be configured from a package or data set of various types of program material data (monomedia data), such as videos, subtitles (and superimposed characters), images of characters/graphics, and/or sound (audio). For example, the program material data is converted into and transmitted in a multiplexed digital data stream (hereinafter referred to as a "stream") in accordance with the MPEG-2 format, which is a high-compression coding technology; however, the present disclosure is not limited thereto. An MPEG-2 transport stream (MPEG-2 TS) is a form of stream consisting of a series of TS packets. In the IPTV service, in order to further reduce communication bandwidth, the MPEG-2 TS is converted into a stream further compressed by using, for example, the H.264/MPEG-4 AVC format, which is a high-compression coding technology. From the viewpoint of transmission technology, a multiplexed stream may sometimes be referred to as a "transmission stream". In the present disclosure, the stream or data related to program content may be referred to as a "program stream" or "program data".

The term "program provision service" refers to a service for providing programs to viewers. The program provision service will be used in a broad concept including the aforementioned conventional digital broadcasting service, an IPTV service, a simultaneous program distribution service, and a similar service.

Figure 1:
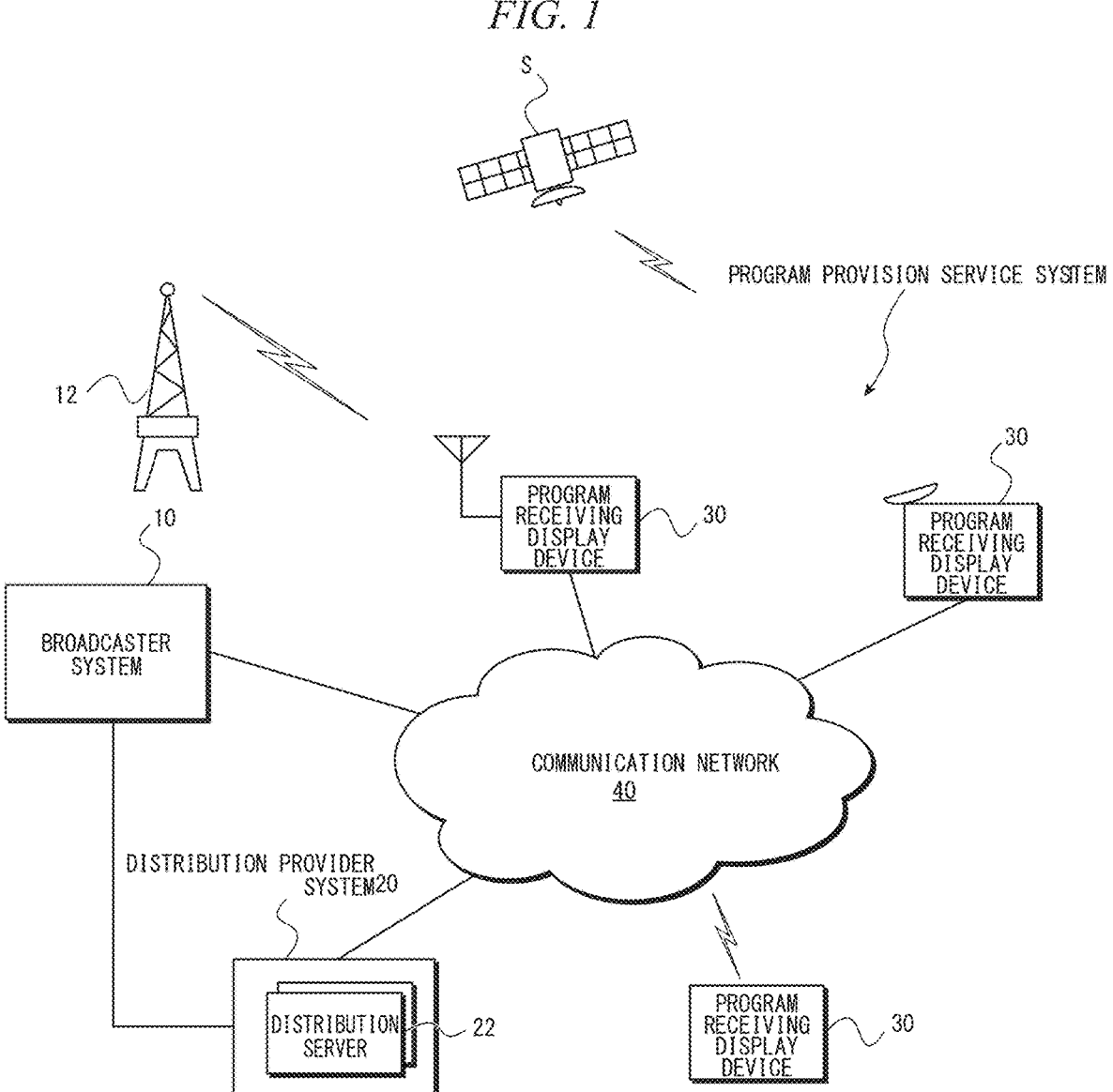
FIG. 1 is a diagram for describing an example of the overall scheme of a program provision service system according to an embodiment of the present invention.

FIG. 1 is a diagram for describing an example of the overall scheme of a program provision service system according to an embodiment of the present invention. As shown in FIG. 1, the program provision service system 1 of the present embodiment is configured to include, for example, a broadcaster system 10, a distribution provider system 20, and a program receiving display device 30. In addition, in the program provision service system 1, at least the distribution provider system 20 and the program receiving display device 30 are communicably connected via a communication network 40.

The broadcaster system 10 may be configured to include broadcasting facilities for providing a digital broadcasting service. Typically, the broadcaster system 10 is managed/operated by a broadcaster, or another entity, who has been granted a broadcasting license (e.g., a broadcasting station), but the present disclosure is not limited thereto. Although not shown, the broadcaster system 10 performs broadcasting (e.g., digital terrestrial broadcasting) by superimposing program content accumulated in a sending server onto broadcast waves under the control of, for example, an automatic operation device.

In other words, the broadcaster system 10: generates a program stream that multiplexes various types of program material data related to the program content together with predetermined service information according to the programs scheduled along a time axis; modulates the program stream into a broadcast signal of a predetermined frequency band; and emits the broadcast signal, as a broadcast wave, from a transmitting base station 12, such as a radio tower, toward a broadcast target area. For the sake of simplifying the description, the present disclosure uses video data, subtitle data, and audio data as the program material data. The predetermined service information includes, for example, EPG information. The broadcaster system 10 transmits the generated program stream, for example, via a dedicated line, to the distribution provider system 20. In the present disclosure, the program stream provided by the broadcaster system 10 may be referred to as a first program stream.

The distribution provider system 20 may be configured to include a distribution server 22 for distributing program streams provided from broadcasters, production companies, or other entities, to a program receiving display device 30 of a viewer via the communication network 40. In the present embodiment, the distribution provider system 20 provides a simultaneous program distribution service by the IPTV service (i.e., the IP broadcasting service in the narrow sense). The distribution provider system 20 is managed/operated by, for example, a content distribution provider (CDN provider), an Internet provider (ISP), or another entity, but the present disclosure is not limited thereto. In addition, a single distribution provider system 20 may include multiple distribution servers 22.

In preparation for the distribution timing, the distribution provider system 20 may accumulate the provided program stream in the distribution server 22 once and may stream the program stream according to the program scheduling using, for example, a RealTime Streaming Protocol (RTSP)/Reatime Transport Protocol (RTP) based on IP multicast to the viewer's program receiving display device 30 via the communication network 40. Alternatively, the distribution provider system 20 may use the RTSP/RTP based on IP unicast to stream to the viewer's program receiving display device 30 via the communication network 40. The program stream may be streamed to an information communication terminal device 30 using HTTP long polling or other transmission protocols. Further, the distribution provider system 20 may distribute data related to a portion of the program content (e.g., program-related information) and other information (e.g., EPG information or channel allocation information) to the viewer's program receiving display device 30. Typically, the distribution provider system 20 may scramble and distribute the program stream. In the present disclosure, the program stream provided by the distribution provider system 20 may be referred to as a second program stream. Also, the second program stream may include a multicast program stream by the IP broadcasting service (e.g., the IP distribution service) and a unicast program stream by the VOD distribution service.

As will be described in other embodiments, the distribution provider system 20 may switch the program stream with respect to the program receiving display device 30 between the IP broadcasting service and the VOD distribution service, depending on the viewer's predetermined operations and/or the reproduction status of the program. In this case, the distribution provider system 20 may include a distribution server 22 for the IP broadcasting service and a distribution server 22 for the VOD distribution service. Alternatively, the distribution server 22 may be configured to operate in a multicast distribution mode for the IP broadcasting service and in a unicast distribution mode for the VOD distribution service, and the distribution mode may be switched depending on the distribution request.

In the present disclosure, the broadcaster system 10 and the distribution provider system 20 are configured as separate systems; however, the present disclosure is not limited thereto, and the broadcaster system 10 may be configured to include the functions of the distribution provider system 20, and vice versa. In addition, the distribution provider system 20 may be managed/operated by the broadcaster.

The program receiving display device 30 is a terminal device for a viewer (user) to watch programs provided in the program provision service. Typically, the program receiving display device 30 may be a so-called television receiver or set-top box, but the present disclosure is not limited thereto. In other words, the program receiving display device 30 may be any device that is adapted for the digital broadcasting service and the IPTV service and has a function that may enable viewers to watch the desired program. Other examples of the program receiving display device 30 may include a computing device, such as a desktop computer, a notebook computer, a tablet computer, a smartphone, a feature phone, and other intelligent devices.

The program receiving display device 30 of the present embodiment is configured, in the case of receiving the broadcast wave related to a program broadcast from the broadcaster system 10 according to the program scheduling along the time axis and playing back/displaying such program, to switch to the distribution of a program from the distribution provider system 20 that provides the IPTV broadcasting service, in response to the viewer's predetermined operation, and to display such program. For example, if the viewer's predetermined operation is a time-shifted reproduction operation, the program receiving display device 30 requests the distribution provider system 20 a program stream corresponding to a point of time in the past (hereinafter referred to as the "past time"), which is prior to the actual time on the time axis. In response to this request, the distribution provider system 20 distributes the program stream corresponding to the past time. As a result, the program receiving display device 30 receives/reproduces programs from the past time.

The communication network 40 may include, for example, an IP-based computer network (hereinafter referred to as the "IP network"). The communication network 40 may include a form of a Content Delivery Network (CDN). In the present disclosure, the communication network 40 is used in a broad concept including the Internet constructed by IP networks, but it is not limited to the IP networks and is not intended to exclude networks of other protocols that allow for the distribution of program streams. In addition, the communication network 40 may include wireless networks (e.g., Wi-Fi (registered trademark), etc.) constructed by wireless base stations or wireless access points that are not shown. In addition, the communication network 40 may include a mobile communication network that conforms to the mobile communication system standards.

Figure 2:
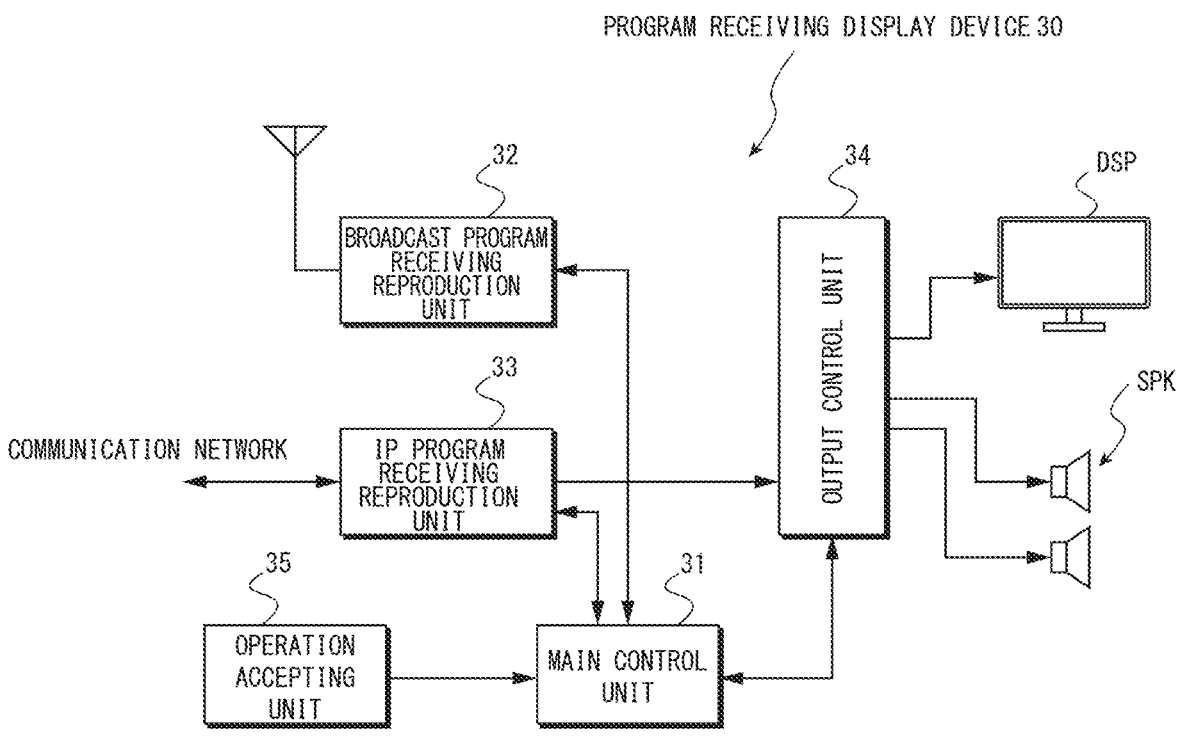
FIG. 2 is a block diagram showing an example of a schematic configuration of a program receiving display device according to an embodiment of the present invention.

FIG. 2 is a block diagram showing an example of a schematic configuration of a program receiving display device according to an embodiment of the present invention. As shown in FIG. 2, the program receiving display device 30 is configured to include, for example: a main control unit 31; a broadcast program receiving reproduction unit 32, which performs processing for receiving and playing back broadcast programs; an IPTV program receiving reproduction unit 33 for receiving and displaying/reproducing IPTV programs; an output control unit 34; and an operation accepting unit 35 for accepting the viewer's operations. In addition, as shown in FIG. 2, the program receiving display device 30 may include a display device DSP and a speaker SPK as output devices.

The main control unit 31 is a component that controls the operations of the program receiving display unit 30 in an integrated manner. Although not shown, the main control unit 31 is configured to include a processor module including a CPU, a memory module including various types of memory, and other components. In addition, the main control unit 31 may control the operations of the applications implemented in the program receiving display device 30 under the control of the CPU. The applications may be pre-implemented in the program receiving display device 30, or may be downloaded by the broadcast wave or over the communication network 40, and then implemented.

The main control unit 31 also holds, for example, channel allocation information, EPG information, station selection control information, and other information in the memory. The channel allocation information defines channel allocations in the respective service areas that are partitioned by the ranges reachable by the broadcast wave. The EPG information is a so-called electronic program guide and defines the program scheduling by channels and distribution time slots along the time axis. The channel allocation information and the EPG information are, for example, acquired from broadcast waves as part of the predetermined service information.

In addition, the main control unit 31 performs control for causing the program receiving display device 30 to operate in predetermined operational modes. Examples of the predetermined operational modes include a first operational mode for receiving/reproducing program content in the digital broadcasting service, and a second operational mode for receiving/reproducing program content in the IPTV service. The second operational mode may also include an operational mode in which the reproduction speed is varied when receiving/reproducing the program content in the IPTV service. In addition, as will be described in other embodiments, the predetermined operational modes may include a third operational mode in which the images related to multiple program contents are displayed in multiple frames in a single screen. The main control unit 31 operates the program receiving display device 30 in accordance with an operational mode selected in response to the viewer's operation.

FIG. 3 is a diagram showing an example of a data structure of EPG information applied to the program provision service according to an embodiment of the present invention. As shown in FIG. 3, the EPG information is configured to include, for example, a channel ID, a program ID, a transmission time, an event period, a program name, a program description, and other items. The channel ID is a so-called channel number of the broadcasting station defined in the channel allocation information. The program ID is an identifier for identifying the program content. In the present disclosure, the EPG information further includes link information. The link information is the file location information of the program content. In other words, the link information indicates: the network location information of the distribution server 22 of the distribution provider system 20 that distributes the program content indicated by the program ID; and the file path of such program content. A URL is a form of the link information. The program receiving display device 30 requests the distribution of the program stream to the predetermined distribution server 22 such that the program content is played back from the predetermined reproduction position according to the link information.

The station selection control information includes, for example, the currently selected channel number. When the program receiving display device 30 is turned on, the main control unit 31 starts operation such that the station selection control information is read from the memory and the broadcast program is received and played back.

The broadcast program receiving reproduction unit 32 is a component that performs processing for playing back the program content from the station selected from the received broadcast wave, under the control of the main control unit 31. An example of the configuration of the broadcast program receiving reproduction unit 32 will be described with reference to FIG. 5. It should be noted that, in the present disclosure, the configuration of all or part of the broadcast program receiving reproduction unit 32 is a form of a first program stream acquisition unit.

The IPTV program receiving reproduction unit 33 is a component that performs processing for playing back the program content based on the program stream received from the distribution provider system 20 via the communication network 40, under the control of the main control unit 31. An example of the configuration of the IPTV program receiving reproduction unit 33 will be described with reference to FIG. 6. As will be described later, the IPTV program receiving reproduction unit 33 may receive the program streams by the multicast distribution in the IP broadcasting service and the unicast distribution in the VOD distribution service. It should be noted that, in the present disclosure, the configuration of all or part of the IPTV program receiving reproduction unit 33 is a form of a second program stream acquisition unit.

The output control unit 34 is a component that, under the control of the main control unit 31, performs control such that the images related to the program content are displayed on the display device DSP, and performs control such that the sound synchronized in time with the images is output from the speaker SPK. For example, the output control unit 34 is configured to include a display control unit 341 that controls the output to the display device DSP, and a sound control unit 342 that controls the output to the speaker SPK.

The display control unit 341 combines subtitle data, and other data, with the input video data in a selective and superimposing manner, converts the result into a video signal by a display driver not shown, and outputs it to the display device DSP. The display device displays the images related to the program content based on the video signal. Examples of the display device DSP include, but are not limited to, a liquid crystal display (LCD), an organic electroluminescent display (OELD), and other displays.

In addition, the sound control unit 342 converts the input audio data into an audio signal and outputs it to the speaker SPK. The speaker SPK outputs audible audio (sound) based on the audio signal.

In addition, as will be described in other embodiments, the output control unit 34 may perform control so that the images related to multiple program contents are displayed in multiple frames formed in the screen of the display device DSP. The technique of displaying images related to the program content in multiple frames in a single screen is known as multi-screen display. In the present disclosure, the output control unit 34 performs control such that, under the control of the main control unit 31, the program content in the digital broadcasting service is displayed in a first frame in the screen and the program content in the IPTV service is displayed in a second frame in the screen.

The operation accepting unit 35 is a component that accepts operation instructions from the viewer to the program receiving display device 30. For example, a viewer can give various instructions to the program receiving display device 30 by operating the various buttons of the remote controller RC, as shown in FIG. 4. The operation accepting unit 35 outputs the accepted operation instructions to the main control unit 31. In the present disclosure, among the various buttons on the remote controller RC, a group of station selection buttons CH_B and a group of time-shifted reproduction buttons T-SHIFT_B are used. The main control unit 31 may serve as a channel selection unit that selects a channel number according to the operation of any button from the group of station selection buttons CH_B. It should be noted that, in the case where the program receiving display device 30 is connected to or equipped with a recorder (program recording device), the group of time-shift reproduction buttons T-SHIFT_B is used as a group of recording and reproduction buttons.

Examples of viewer's operations include an operation of switching channels (broadcasting stations) (station selection operation), a volume adjusting operation, an operation of showing/hiding data broadcast program content, an operation of showing/hiding subtitles, an operation of switching sound modes, a time-shifted reproduction operation, a variable-speed reproduction operation, and other operations.

The time-shifted reproduction refers to the reproduction or playback of program content from the past in terms of the time axis. In other words, the time-shifted reproduction means that the program content originally broadcast in actual time is played back with a time lag in a retrospective manner. The time-shifted reproduction is sometimes referred to as so-called "time-shifted watching" or "chasing reproduction". Variable-speed reproduction refers to the act of increasing the reproduction speed of a program relative to the standard speed (fast reproduction) or slowing it down (slow reproduction) in the chasing reproduction. In the variable-speed reproduction, the sound of the images of the program content may typically be played in synchronization with the reproduction speed of such images. In the case where the fast reproduction of the program content that is being played back in a time-shifted manner is continued, the reproduction position of such program content will catch up with the reproduction position in actual time. In the present disclosure, the group of time-shifted reproduction buttons T-SHIFT_B on the remote controller RC is used for the time-shifted reproduction operation. In addition, with the time-shifted reproduction, it is assumed that the program content watched by the user is switched to, for example, the program content in the VOD distribution service; but the form of the distribution service is not limited thereto.

In the present disclosure, the Fast-Rewind button FR on the remote controller RC is a button for moving the reproduction start position of the program content in the past direction, the Fast-Forward button FF is a button for moving the reproduction start position of the program content in the present direction up to the reproduction start position in actual time, and the Previous button PC is a button for moving (jumping) the reproduction starting position of the program content to the beginning position of the closest program content in the past direction. Each time the Previous button PC is pressed consecutively, the reproduction start position moves to the beginning position of the previous program content. The Next button NC is a button for moving (jumping) the reproduction start position of the program content being played back in a time-shifted manner to the beginning position of the closest program content in the present direction, up to the program content in actual time. Each time the Next button NC is pressed consecutively, the reproduction start position moves to the beginning position of the next program content.

The Pause button PA is a button for temporarily stopping the reproduction of the currently playing program content and for resuming the reproduction of the paused program content. In addition, the Stop button ST is a button to stop the reproduction of the currently playing program content. Moreover, the Reproduction button PL is a button for resuming the reproduction of the program content that has been paused or stopped.

The Low-Speed reproduction button LS is a button for slowing down the reproduction speed of program content. Each time the Low-Speed reproduction button LS is pressed, the reproduction speed changes such as, for example, 0.75× speed=>0.5× speed=>0.25× speed=>1× speed. The High-Speed reproduction button HS is a button for speeding up the reproduction speed of program content. Each time the High-Speed reproduction button HS is pressed, the reproduction speed changes such as, for example, 1.25× speed=>1.5× speed=>1.75× speed=>2× speed=>1× speed. It should be noted that the reproduction speed is not limited to these speeds, and may be adjusted to any value. The program receiving display device 30 operates in the variable-speed reproduction mode by operating the Low-Speed reproduction button LS or the High-Speed reproduction button HS.

FIG. 5 is a block diagram for describing the details of a configuration of part of a program receiving display device according to an embodiment of the present invention. For ease of understanding, FIG. 5 shows an example of the details of the configuration of the broadcast program receiving reproduction unit 32 of the program receiving display device 30, together with the other components involved.

As shown in FIG. 5, the broadcast program receiving reproduction unit 32 is be configured to include a tuner/modulation unit 321, a descrambling unit 322, a separation unit 323, a decoding unit 324, and a data broadcasting engine 325. FIG. 5 also shows, as the configuration of the output control unit 34, a blending unit 3411, a display driver 3412, and an audio driver 3421, in connection with the broadcast program receiving reproduction unit 32. The configuration that includes the blending unit 3411 and the display driver 3412 is one aspect of the display control unit 341, and the configuration that includes the audio driver 3421 is one aspect of the sound control unit 342.

The tuner/modulation unit 321 extracts the desired broadcast signal by tuning (station-selecting) the broadcast wave received by an antenna, or the like, and then demodulates the signal to acquire the program stream. The program stream at this stage is in a scrambled state. In addition, the tuner/modulation unit 321 may perform error correction processing when demodulating the program stream. In the present example, the tuner/modulation unit 321 is configured as a single component, but the present disclosure is not limited thereto and may be configured as separate components. The tuner/modulation unit 321 outputs the demodulated program stream to the descrambling unit 322.

The descrambling unit 322 descrambles (decrypts) the demodulated program stream using a decryption key and restores it to the original multiplexed program stream. For example, the decryption key is read from an IC card (not shown) called a CAS card installed in a broadcast receiving terminal device. The descrambling unit 322 outputs the multiplexed program stream in the descrambled state to the separation unit 323.

The separation unit 323 separates the multiplexed program stream in the descrambled state into each stream. A demultiplexer is a form of the separation unit 323. The separation unit 323 outputs each stream separated from the multiplexed program stream to the decoding unit 324, the data broadcasting engine 325, and the main control unit 31. For example, the separation unit 323 outputs the video stream, audio stream, and subtitle stream separated from the program stream to the decoding unit 324, and outputs the stream for data broadcast to the data broadcasting engine 325. In addition, the separation unit 323 outputs the separated predetermined service information to the main control part 31.

The decoding unit 324 decodes each stream to generate the program material data that constitutes the program content. The decoding unit 324 is configured to include, for example, a video decoding unit 3242, an audio decoding unit 3243, and a subtitle decoding unit 3244.

The video decoding unit 3241 decodes the video stream using a codec that conforms to the MPEG-2 video standard, for example, and generates video data. The video decoding unit 3241 outputs the generated video data to the output control unit 34.

The audio decoding unit 3242 decodes the audio stream according to the MPEG-2 audio standard, for example, and generates audio data. For example, in the case of sound-multiplex broadcasting, the audio stream may include a primary sound audio stream and a secondary sound audio stream. The audio decoding unit 3242 outputs the generated audio data to the output control unit 34.

The subtitle decoding unit 3243 decodes the subtitle stream according to the exchange format of the subtitle file for broadcasting, for example, and generates subtitle data. The subtitle decoding unit 3243 outputs the generated subtitle data to the output control unit 34. The subtitle data output to the output control unit 34 is combined with the video data in a selective and superimposing manner to form part of the image content of the program.

The data broadcasting engine 325 decodes the separated data broadcasting stream to generate display data and display control signals for data broadcasting. The data broadcasting engine 325 analyzes the display control signal and controls the output control unit 34 to display the display data for data broadcasting based on the analysis results.

The blending unit 3411 combines other program material data (e.g., subtitle data) related to displaying with the video data in a superimposing manner, and generates display data. Data combining is performed, for example, by a-blending using transmission information coefficients (a values). The blending unit 3411 outputs the generated display data to the display driver 3412.

The display driver 3412 converts the input display data into a video signal adapted for the display device DSP and outputs this to the display device DSP. This allows the display device DSP to display an image of the broadcast program.

The audio driver 3421 converts the input audio data into an audio signal and outputs this to the speaker SPK. The audio data is synchronized in time with the display data and converted into the audio signal. As a result, the speaker SPK outputs audio synchronized in time with the images of the broadcast program.

FIG. 6 is a block diagram for describing the details of a configuration of part of a program receiving display device according to an embodiment of the present invention. For ease of understanding, FIG. 6 shows an example of the details of the configuration of the IPTV program receiving reproduction unit 33 of the program receiving display device 30, together with the other components involved.

As shown in FIG. 6, the IPTV program receiving reproduction unit 33 is configured to include, for example, a communication interface unit 331, a streaming requesting unit 332, a streaming receiving processing unit 333, a separation unit 334, and a decoding unit 335. The configuration of the IPTV program receiving reproduction unit 33 is basically equivalent to the configuration of the broadcast program receiving reproduction unit 32, except that the program stream is received via the communication network 40. In other words, the IPTV service shares the so-called content layer in the protocol stack with the digital broadcasting service. FIG. 6 also shows, as the configuration of the output control unit 34, the blending unit 3411, the display driver 3412, the audio driver 3421, and a buffering unit 3413, in connection with the IPTV program receiving reproduction unit 33.

In other words, as shown in FIG. 6, the communication interface unit 331 is a component that allows for computer communication via the communication network 40. In the present disclosure, the communication interface unit 331 is primarily used for communication (e.g., streaming) with the distribution provider system 20 via the communication network 40.

The streaming requesting unit 332 sends, under the control of the main control unit 31, a request for distribution of program content with the IPTV service (e.g., a VOD distribution request) based on the URL associated with the channel number according to the station selection control information. In response, the distribution provider system 20 starts VOD streaming the program content according to, for example, the RTSP by unicast. The program content streamed by the distribution provider system 20 is substantially equivalent to the program content broadcast in the digital broadcasting service. In other embodiments, the streaming requesting unit 332 is configured to selectively send either an IP multicast distribution request in the IP broadcasting service (an IP distribution request) or a unicast distribution request in the VOD distribution service (a VOD distribution request), depending on the viewer's operations and/or the reproduction status of the program content.

The streaming receiving processing unit 333 decrypts the transmission stream in, for example, a H.264/MPEG-4 AVC format, distributed from the distribution provider system 20 and generates a multiplexed program stream in a MPEG-2 TS format. The streaming receiving processing unit 333 outputs the generated multiplexed program stream to the separation unit 334.

The separation unit 334 separates the multiplexed program stream into each stream. The separation unit 334 may have the same configuration as that of the separation unit 323 of the broadcast program receiving reproduction unit 32 described above. In the present example, the separation unit 334 outputs each stream separated from the multiplexed program stream to the decoding unit 335 and the main control unit 31.

The decoding unit 335 decodes each stream to generate the program material data that constitutes the program content. The decoding unit 335 may also have the same configuration as that of the decoding unit 334 of the broadcast program receiving reproduction unit 32 described above.

The buffering unit 3413 temporarily buffers each piece of the decoded program material data. Each piece of the buffered program material data is output to the display control unit or the sound control unit under the control of the main control unit 31. In the case of variable-speed reproduction, the program material data is read accordingly at the designated reproduction speed.

It should be noted that, in the present disclosure, each of the broadcast program receiving reproduction unit 32 and the IPTV program receiving reproduction unit 33 is configured to have a separation unit and a decoding unit, but the present invention is not limited thereto, and they may be configured to share the separation unit and the decoding unit. In this case, for example, either the program stream in the digital broadcasting service or the program stream in the IPTV service is selected by a selector and input to the separation unit, under the control of the main control unit 31.

FIG. 7 is a flowchart showing an example of operations of a program receiving display device according to an embodiment of the present invention. Such processing may be achieved, for example, by coordinated operations among the various components according to the execution of a predetermined control program under the control of a processor of the main control unit 31.

As shown in FIG. 7, for example, when the program receiving display device 30 is turned on, the device sets, as start-up processing, to the first operating mode and reads the station selection control information stored in the memory (S701). The program receiving display device 30 then extracts the program stream from the received broadcast wave according to the channel number indicated by the station selection control information, and then starts reproduction of the program content based on the extracted program stream (S702). In other words, the program receiving display device 30 operates in the first operational mode in which the digital broadcasting service is selected to receive/reproduce the program content. As a result, the display device DSP displays the images related to the program content and outputs audio synchronized with the images from the speaker SPK.

Further, the program receiving display device 30 acquires the URL corresponding to the program ID of the channel number indicated by the station selection control information according to the EPG information, and stores the URL in the memory (S703). As will be described later, in the case of switching to the IPTV service, the program receiving display device 30 receives and plays back the program stream distributed from the distribution provider system 20 according to the acquired URL. In the present embodiment, the distribution provider system 20 distributes the program stream by unicast. In order to suppress reproduction delay at the time of switching to the IPTV service, the program receiving display device 30 may, for example, carry out processing to establish a communication session by performing a handshake in advance with the distribution server 22 of the distribution provider system 20 according to the acquired URL.

The program receiving display device 30 monitors whether various operations have been made by the viewer during reproduction of the program content in actual time (S704). While the present disclosure describes only the station selection operation and time-shifted reproduction operation, it is not limited thereto.

More specifically, in the case where the program receiving display device 30 determines that the station selection operation by the viewer is accepted, the device updates the channel number according to the station selection operation (S705), and returns to the processing step S702 described above. This allows the program receiving display device 30 to switch from the second operational mode to the first operational mode to start playing back the program content according to the updated channel number (S702), and then, to acquire, according to the EPG information, the URL corresponding to the channel number indicated by the station selection control information and store the URL in the memory (S703).

On the other hand, in the case where the program receiving display device 30 determines that a predetermined time-shifted reproduction operation by the viewer is accepted, the device starts the time-shifted reproduction processing (S706). More specifically, the program receiving display device 30 switches the operational mode from the first operational mode to the second operational mode. The time-shifted reproduction operation here is a time-shifted operation to go back to a point of time in the past, and is achieved by, for example, the viewer pressing the Fast-Rewind button FR or the Previous button PC on the remote controller RC.

FIG. 8 is a flowchart showing an example of time-shifted reproduction processing by a program receiving display device according to an embodiment of the present invention. FIG. 8 is the flowchart detailing S706 shown in FIG. 7. In addition, the details of the processing step S801 shown in FIG. 8 are shown in FIG. 9.

As shown in FIG. 8, the program receiving display device 30 determines the reproduction starting position of the program content on the time axis based on the viewer's time-shifted reproduction operation (S801). Here, since this is the time-shifted reproduction processing for the program contents in the digital broadcasting service, the case in which the Fast-Rewind button FR or the Previous button PC is pressed, will be described.

More specifically, as shown in FIG. 9, the program receiving display device 30 determines whether the viewer has pressed the Fast-Rewind button FR or the Previous button PC on the remote controller RC (S901). If the program receiving display device 30 determines that the viewer has pressed the Fast-Rewind button FR on the remote controller RC, the device reverses the reproduction start position in the past direction according to the length of the pressed time to determine the reproduction start position (S902).

For example, if the Fast-Rewind button FR on the remote controller RC is pressed, the program receiving display device 30 superimposes a seek bar SKB on the screen 1000 of the program content displayed on the display device DSP, as shown in FIG. 10. The seek bar SKB is an icon that indicates the start to the end of the program content on the time axis and includes a slider SL that indicates the current reproduction position. The viewer can, for example, move the slider to a position indicating a desired time in the past earlier than the present position by continuously pressing and holding the Fast-Rewind button FR on the remote controller RC. This allows the program receiving display device 30 to determine the reproduction start position corresponding to the position of the slider moved by the viewer's operation. The seek bar SKB may be displayed as a pop-up window.

The program receiving display device 30 determines whether the determined reproduction start position exceeds the time frame of the program content currently being played back (S903). In other words, the program receiving display device 30 determines whether the determined reproduction start position is on the time axis of the previous program content.

The program receiving display device 30 moves to S802 in FIG. 8, if it determines that the reproduction start position does not exceed the time frame of the program content currently being played back ("No" in S903). More specifically, the program receiving display device 30 sends a program stream distribution request (a VOD distribution request) specifying the determined reproduction start position to the distribution server 22 according to the URL held in the memory (S802). The distribution server 22 responds to the distribution request and starts the distribution of the program stream. As a result, the program receiving display device 30 receives the program stream distributed from the distribution server 22 and starts reproduction (S803). At this time, the program receiving display device 30 stops the reproduction of the broadcast wave-based program. More specifically, the program receiving display device 30 selectively switches the program stream to be received from the one in the digital broadcasting service to the one in the IPTV service. The program receiving display device 30 operates in the second operational mode in which the IPTV service is selected to receive/reproduce the program content. As a result, the display device DSP displays images of the program content progressing along the time axis from the reproduction start position in the past and outputs the audio of the images from the speaker SPK.

On the other hand, with reference to FIG. 9, if the program receiving display device 30 determines that the reproduction start position exceeds the time frame of the program content currently being played back ("Yes" in S903), it refers to the EPG information and updates the URL held in the memory to the URL corresponding to the previous program content (S905).

For example, if the viewer continues to press and hold the Fast-Rewind button FR on the remote controller RC, the reproduction start position of the previous program content on the time axis is assumed. In the case where the program receiving display device 30 determines that the switching to the time axis of the previous program content has occurred, as a result of the viewer holding down the Fast-Rewind button FR, it updates the seek bar SKB displayed on the screen to that of the previous program content and updates the URL.

In addition, if the program receiving display device 30 determines that the viewer has pressed the Previous button PC on the remote controller RC, it identifies the beginning position of the closest program content in the past direction and determines this as the reproduction start position (S904). For example, in the case where the Previous button PC is pressed only once, the beginning position of the closest program content in the past direction is the beginning position of the program content currently being played back. The program receiving display device 30 then, by referring to the EPG information, updates the URL held in the memory to the URL corresponding to the previous program content (S905).

When the URL of the program content to be received/reproduced is updated, the program receiving display device 30 moves to S802 in FIG. 8. More specifically, as described above, the program receiving display device 30 sends a program stream IP distribution request specifying the determined reproduction start position to the distribution server 22 according to the URL held in the memory (S802). The distribution server 22 responds to the distribution request and starts the distribution of the program stream. Thereby, the program receiving display device 30 receives a program stream distributed from the distribution server 22 and starts reproduction of the program stream, in lieu of the program stream based on broadcast waves in the digital broadcasting service (S803). More specifically, the program receiving display device 30 acquires, according to the link information of another program content in a distribution time zone different from the distribution time zone of the program content in actual time, the program stream of such another program content and plays back the same. As a result, the display device DSP displays the images of the previous program content and outputs audio from the speaker SPK.

For example, as shown in FIG. 11A, suppose that program contents L, M, N are organized along the time axis, and the program receiving display device 30 is playing back the images/audio of the program content N in actual time at the reproduction position P. Now, if the viewer presses and holds the Fast-Rewind button FR for some time, the reproduction position P moves in the past direction, as shown in FIG. 11B, and the position where the Fast-Rewind button FR is released becomes the reproduction start position P11. In short, the program content N in the IPTV service will be played back with a time difference D=P−P11 on the time axis.

Moreover, if the viewer presses and holds the Fast-Rewind button FR for a longer period of time, the program content M broadcast before the program content N will be played back from the reproduction start position P12, as shown in FIG. 11C.

As described above, by operating the Fast-Rewind button FR or the Previous button PC during reproduction of program content in the digital broadcasting service, switching to the program content in the IPTV service occurs and the time-shifted reproduction of the program content is achieved.

On the other hand, if the viewer presses the Previous button PC once when the images/audio of the program content N broadcast in actual time is being played back at the reproduction position P1 (see FIG. 11A), the reproduction start position of the program content is moved to the beginning position P21 of the program content N currently being played back, as shown in FIG. 12A, and from there, the reproduction of the program content N starts.

If the viewer presses the Previous button PC twice in succession, the reproduction start position of the program content is moved to the beginning position P22 of the program content M, a program content prior to the program content N, as shown in FIG. 12B, and the reproduction of the program content M starts. Similarly, if the viewer presses the Previous button PC three times in succession, the reproduction start position of the program content moves to the beginning position P23 of the program content L, two program contents prior to the program content N, as shown in FIG. 12C, and the reproduction of the program content L starts.

Returning to FIG. 8, the program receiving display device 30 monitors whether various operations have been made by the viewer during reproduction of the program content in the IPTV service (i.e., during the time-shifted reproduction), as with the case of the digital broadcasting service (S804). While the present disclosure describes only the station selection operation, the time-shifted reproduction operation, and the variable-speed reproduction operation as the viewer's operations, it is not limited thereto. It should be noted that the reproduction position of program content in the IPTV service on the time axis is in the past relative to the reproduction position of the actual-time program content in the digital broadcasting service. Therefore, in the time-shifted reproduction operation here, in addition to the operation instructions by the Fast-Rewind button FR and the Previous button PC, the operation instructions by the Fast-Forward button FF and the Next button NC are also effective.

More specifically, if the program receiving display device 30 determines that a station selection operation by the viewer is accepted in S804, it stops receiving/reproducing the program content in the IPTV service (S805) and returns to the processing step S705 shown in FIG. 7 (terminal A). In short, the program receiving display device 30 switches from the IPTV service to the digital broadcasting service in the case of accepting the station selection operation by the viewer. As a result, the program receiving display device 30 updates the channel number according to the station selection operation by the viewer (S705), and starts reproducing of the program based on the program stream extracted from the received broadcast wave according to the channel number indicated by the station selection control information (S702).

If the program receiving display device 30 determines that a further time-shifted reproduction operation by the viewer is accepted in S804, it determines the reproduction start position of the program content on the time axis according to such time-shifted reproduction operation (S806). The processing of determining the reproduction start position is as set forth in FIG. 9 described above. Since the processing steps in the case in which the viewer presses either the Fast-Rewind button FR or the Previous button PC on the remote controller RC are the same as S901 to S905 described above, the description thereof will be omitted.

With reference to FIG. 9, the program receiving display device 30 forwards the reproduction start position on the time axis in the present direction according to the length of the pressed time to determine the reproduction start position in the case where the viewer has pressed the Fast-Forward button FF on the remote controller RC (S906). The program receiving display device 30 then determines whether or not the determined reproduction start position has reached the reproduction position in actual time (S907).

If the program receiving display device 30 determines that the determined reproduction start position has reached the reproduction position in actual time ("Yes" in S907), it stops receiving/reproducing the program content in the IPTV service (S908) and then returns to the processing step S702 shown in FIG. 7 (terminal B). As described above, this allows the program receiving display device 30 to switch from the second operational mode to the first operational mode to start receiving/reproducing the program content in the digital broadcasting service according to the current channel number (S702), and then, to acquire, according to the EPG information, the URL corresponding to the channel number indicated by the station selection control information and store the URL in the memory (S703).

On the other hand, if the program receiving display device 30 determines that the determined reproduction start position has not reached the reproduction position in actual time ("No" in S907), it further determines whether the determined reproduction start position has exceeded the time frame of the program content currently being played back (S909). In other words, the program receiving display device 30 determines whether the determined reproduction start position is on the time axis of the next program content. If the program receiving display device 30 determines that the reproduction start position does not exceed the time frame of the program content currently being played back ("No" in S909), it moves to S802 in FIG. 8 described above.

On the other hand, if the program receiving display device 30 determines that the reproduction start position exceeds the time frame of the program content currently being played back ("Yes" in S909), it refers to the EPG information and updates the URL held in the memory to the URL corresponding to the next program content (S912), and moves to S802 in FIG. 8.

In the case where the viewer presses the Next button NC on the remote controller RC (S910), the program receiving display device 30 also determines whether the program content currently being played back is program content prior to the actual-time program content.

If the program receiving display device 30 determines that the program content currently being played back is not the program content prior to the actual-time program content (namely, it is a program content in actual time) ("No" in S910), it stops receiving/reproducing the program content in the IPTV service (S908), and then, returns to the processing step S702 shown in FIG. 7 (terminal B).

On the other hand, if the program receiving display device 30 determines that the program content currently being played back is program content prior to the actual-time program content ("Yes" in S910), it sets the beginning position of the next program content as the reproduction start position (S911). The program receiving display device 30 then, by referring to the EPG information, updates the URL held in the memory to the URL corresponding to the next program content (S912), and moves to S802 in FIG. 8.

For example, as shown in FIG. 13A, suppose that program contents L, M, and N are organized along the time axis, and the images/audio of the program content N broadcast in actual time are played back at the reproduction position P, and the images/audio of the program content L played back by the time-shifted reproduction are played back at the reproduction position P31. Now, if the viewer presses and holds the Fast-Forward button FF for some time, the reproduction position P31 moves in the present direction, as shown in FIG. 13B, and the position where the Fast-Forward button FF is released becomes the reproduction start position P32, and the images/audio of the program content L will be played back from the reproduction start position P32.

Moreover, if the viewer presses and holds the Fast-Forward button FF for a longer period of time, the reproduction will start from, for example, the reproduction start position P33 of the program content N, as shown in FIG. 13C. It should be noted that, if the reproduction position P is reached by the viewer pressing and holding the Fast-Forward button FF, the IPTV service will be switched to the digital broadcasting service.

On the other hand, if the viewer presses the Next button NC once when the images/audio of the program content L are being played back at the reproduction position P31 (see FIG. 13A) in the time-shifted reproduction, the reproduction start position of the program content is moved to the beginning position P32 of the next program content M, as shown in FIG. 14A, and from there, the reproduction of the program content M will start.

If the viewer presses the Next button NC twice in succession, the reproduction start position of the program content is moved to the beginning position P22 of the program content N, a program content ahead of the program content L, as shown in FIG. 14B, and the reproduction of the program content N will start. It should be noted that, even if the viewer presses the Next button NC in the status shown in FIG. 14B, the reproduction position P in actual time will not be exceeded, and the IPTV service will be switched to the digital broadcasting service, and the images/audio of the program content N will be played back from the reproduction position P.

As described above, time-shifted reproduction of program content is achieved from any reproduction start position by operating the Fast-Forward button FF or the Next button NC, in addition to the Fast-Rewind button FR and/or the Previous button PC, during reproduction of program content in the IPTV service.

Further in the present disclosure, the program receiving display device 30 may accept operation instructions for variable-speed reproduction during reproduction of the program content in the IPTV service.

More specifically, if the program receiving display device 30 determines that a variable-speed reproduction operation by the viewer is accepted in S804 of FIG. 8, it receives/reproduces the program content according to the specified reproduction speed (S807). Examples of the reproduction speed that can be specified include 0.25× speed, 0.5× speed, 0.75× speed, 1.25× speed, 1.5× speed, 1.75× speed, 2× speed, and other speeds. The viewer can change the reproduction speed of the program content by pressing the Low-Speed reproduction button LS or the High-Speed reproduction button HS.

If the program receiving display device 30 plays back the program content at a high speed from a point of time in the past, the reproduction position of the program content may catch up with or reach the position in actual time. Therefore, the program receiving display device 30 monitors whether the reproduction position of the program content has caught up with the position in actual time. If the program receiving display device 30 determines that the reproduction position of the program content has caught up with the actual time, it terminates or cancels the variable-speed reproduction. As a result, the reception/reproduction of program content in the IPTV service will be substantially the same as that in the digital broadcasting service, in other words, it will be a simultaneous program distribution service. Alternatively, if the program receiving display device 30 determines that the reproduction position of the program content has caught up with the actual time, it may terminate or cancel the variable-speed reproduction and switch to receiving/reproducing the program content in the digital broadcasting service.

As described above, according to the present embodiment, viewers who are watching a program in actual time in the conventional digital broadcasting service can switch to the IPTV service that realizes a simultaneous program distribution service by selecting time-shifted reproduction of such program by operating the remote controller RC. Therefore, viewers can watch the past images/audio of the program they are watching in actual time with a very simple operation. In particular, the conventional time-shifted reproduction of programs required television receivers to be equipped with a high-capacity hard disk. However, according to the present embodiment, the program receiving display device 30 can realize time-shifted reproduction of programs without having to be equipped with such a high-capacity hard disk.

In the present embodiment, the program receiving display device 30 performs control to return to the digital broadcasting service in the case where the station selection operation by the viewer is accepted or the program content reproduction position in the IPTV service catches up with the reproduction position in actual time; but the present disclosure is not limited thereto. For example, the program receiving display device 30 may also perform control to return to the digital broadcasting service in the case where an operation of a return button, an end button, or other buttons, by the viewer is accepted.

Second Embodiment

The present embodiment is characterized in that, in the case where the program receiving display device 30 accepts a time-shifted reproduction operation, it performs control to set the operational mode to a third operational mode (a multi-screen display mode) such that the actual-time program content in the digital broadcasting service is displayed in a first frame of the display device DSP and the program content for time-shifted reproduction in the IPTV service is displayed in a second frame of the display device DSP. In the following, a two-screen display mode (a 2-in-1 screen display mode) will be illustrated as the multi-screen display mode, but the present disclosure is not limited thereto.

For example, suppose that a time-shifted reproduction operation is made by the viewer during reproduction of the actual-time program content in the program receiving display device 30, as shown in FIG. 7 (S704 in FIG. 7). In the present embodiment, in the case where the program receiving display device 30 accepts a time-shifted reproduction operation, it switches the screen mode from the normal mode to the two-screen display mode, under the control of the main control unit 31, and receives/reproduces the actual-time program content in the digital broadcasting service, and also receives/reproduces the time-shifted program content in the IPTV service. In the two-screen display mode, for example, the output control unit 34 performs rendering/layout processing so that images related to the program contents based on the two program streams are displayed in two frames on one screen.

FIG. 15 is a diagram for describing an example of a screen displayed on a program receiving display device according to an embodiment of the present invention. As shown in FIG. 15, the screen 1500 of the two-screen display mode in the display device DSP of the present embodiment is configured to include a first frame 1501 and a second frame 1502. For example, the first frame 1501 displays the actual-time program content in the digital broadcasting service, while the second frame 1502 displays the time-shifted program content in the IPTV service.

The screen 1500 may also include a sound output icon 1503. The sound output icon 1503 indicates whether the audio (sound) synchronized with the program content currently being played back is that of the actual-time program content or that of the time-shifted program content. In FIG. 15, the audio output icon 1503 indicates that the audio for the actual-time program content is turned off and the audio for the time-shifted program content is being output. For example, the main control unit 31 may be controlled so that the frame to be operated is selectively switched by the viewer operating a switch button (e.g., the arrow button) on the remote controller RC.

More specifically, the viewer may provide instructions, such as the station selection operation, the further time-shifted reproduction operation, the variable-speed reproduction operation described above, or other operations, to the program receiving display device 30 in such two-screen display mode. As an example, if the program receiving display device 30 determines that the station selection operation by the viewer is accepted, it updates the channel number according to the station selection operation, exits the two-screen display mode, and returns to receiving/reproducing the actual-time program content in the digital broadcasting service. As another example, if the program receiving display device 30 determines that the time-shifted reproduction operation by the viewer is accepted, it performs time-shift reproduction processing according to the button operated.

As described above, according to the present embodiment, the same advantages as those of the embodiment described above may be achieved. In particular, according to the present embodiment, viewers can simultaneously watch actual-time programs in the digital broadcasting service and time-shifted programs in the IPTV service in the two-screen display mode. For example, a viewer watching a soccer game can enjoy a watching style such as watching the goal scene in the past while also checking the status of the game in actual time when they want to see the goal scene again. This allows viewers to enjoy watching the program without missing additional highlight scenes during the game in actual time.

In addition, in the current digital broadcasting service, programs related to data broadcasting are linked to actual-time programs. Therefore, viewers cannot enjoy the information provision by the programs related to data broadcasting unless they are watching the actual-time programs. However, according to the present embodiment, since the actual-time program is displayed in one of the frames, it is possible to enjoy the information provision by program content related to data broadcasting while also watching the time-shifted program.

Third Embodiment

The present embodiment is characterized in that, in the case where the program receiving display device 30 accepts a time-shifted reproduction operation, it performs control such that the time-shifted program content in the IPTV service, as well as an indicator indicating the IPTV service, are displayed on the display device DSP.

FIG. 16 is a diagram for describing another example of a screen displayed on a program receiving display device according to an embodiment of the present invention. As shown in FIG. 16, the screen 1600 of the display device DSP in the present embodiment displays the program content that is being played back in a time-shifted manner, as well as the indicator 1601. For example, suppose that, in the program receiving display device 30, a time-shifted reproduction operation is made by the viewer during the reproduction of the actual-time program content (a first program), as described above. In the present embodiment, in the case where the program receiving display device 30 accepts a time-shifted reproduction operation, it receives/reproduces the time-shifted program content (a second program) in the IPTV service under the control of the main control unit 31. At this time, for example, the output control unit 34 performs rendering/layout processing such that the indicator 1601 indicating the IPTV service is superimposed on the time-shifted program content.

In addition, if any of the buttons of the group of time-shifted reproduction buttons T-SHIFT_B on the remote controller RC is pressed, the program receiving display device 30 may superimpose a seek bar SKB, as shown in FIG. 10, on the screen 1600 of the program content.

The program receiving display device 30 may also perform control to display a visually different indicator from the indicator 1601 when playing back actual-time program content in the digital broadcasting service, in addition to when playing back the time-shifted program content in the IPTV services. Alternatively, in lieu of displaying an indicator on the screen of the display device DSP, the program receiving display device 30 may use an LED, or any other indicator, provided on the program receiving display device 30, as an indicator.

As described above, according to the present embodiment, the same advantages as those of the embodiments described above may be achieved. In particular, according to the present embodiment, viewers can easily recognize that the program they are currently watching is a time-shifted program in the IPTV service. In addition, the seek bar SKB in the time-shifted reproduction operation occupies a relatively wide area of the lower part of the screen, so it would interfere with watching if it is displayed all the time; however, in the case of the indicator 1601 as in the present example, it would not interfere with watching even if it is displayed all the time.

Fourth Embodiment

The present embodiment is characterized in that, in the case where the reproduction position of the program content during time-shifted reproduction in the VOD distribution service reaches (catches up with) the position in actual time, the program receiving display device 30 switches from the VOD distribution service to the IP broadcasting service (e.g., the IP distribution service) to receive/reproduction the program content.

In the present embodiment, the distribution server 22 of the distribution provider system 20 may be configured to operate in the multicast distribution mode in the IP broadcasting service and the unicast distribution mode in the VOD distribution service. In addition, the IPTV program receiving reproduction unit 33 of the program receiving display device 30 may selectively switch to either the IP distribution request in the IP broadcasting service or the VOD distribution request in the VOD distribution service, depending on the viewer's predetermined operation and/or the reproduction status of the program content, and receive the relevant program stream.

FIG. 17 is a flowchart showing an example of time-shifted reproduction processing performed by a program receiving display device according to an embodiment of the present invention. More specifically, FIG. 17 shows the processing in which the program receiving display device 30 determines the reproduction start position of the program content on the time axis in response to the time-shifted reproduction operation by the viewer. FIG. 17 differs from FIG. 9 in that, in the case where the reproduction position of the program content reaches the reproduction position in actual time due to a predetermined time-shifted reproduction operation, switching is made from the VOD distribution service to the IP broadcasting service. Since the remainder is the same as FIG. 9, the description of the same part will be omitted accordingly.

More specifically, as shown in FIG. 17, the program receiving display device 30 forwards the reproduction start position on the time axis in the present direction according to the length of the pressed time to determine the reproduction start position in the case where the viewer has pressed the Fast-Forward button FF on the remote controller RC (S1706). The program receiving display device 30 then determines whether or not the determined reproduction start position has reached the reproduction position in actual time (S1707).

If the program receiving display device 30 determines that the determined reproduction start position has reached the reproduction position in actual time ("Yes" in S1707), it switches from receiving/reproducing the program content in the VOD distribution service to receiving/reproducing the program content in the IP broadcasting service (1708). The details of the processing step S1708 are shown in FIG. 18.

The program receiving display device 30 also determines whether the program content currently being played back is program content prior to the actual-time program content, in the case where the viewer presses the Next button NC on the remote controller RC (S1710).

If the program receiving display device 30 determines that the program content currently being played back is not program content prior to the actual-time program content (namely, it is a program content in actual time) ("No" in S1710), it switches from receiving/reproducing the program content in the VOD service to receiving/reproducing the program content in the IP broadcasting service (1708).

FIG. 18 is a flowchart showing an example of reception/reproduction processing of program content in an IP broadcasting service performed by a program receiving display device according to an embodiment of the present invention.

As shown in FIG. 18, the program receiving display device 30 sends a program stream distribution request (i.e., an IP distribution request) specifying the determined reproduction start position to the distribution server 22 according to the URL held in the memory (S1801). At this time, the program receiving display device 30 stops receiving the program stream based on the previous VOD distribution request. The distribution server 22 responds to the new distribution request and starts the distribution of the program stream. As a result, the program receiving display device 30 receives the program stream distributed from the distribution server 22 and starts reproduction the program stream (S1802). In short, the program receiving display device 30 selectively switches the form of the distribution service from the VOD distribution service to the IP broadcasting service.

The program receiving display device 30 monitors whether various operations have been made by the viewer during reception/reproduction of the program content in actual time (S1803). While the present disclosure describes only the station selection operation and time-shifted reproduction operation, it is not limited thereto.

In the case where the program receiving display device 30 determines that the station selection operation by the viewer is accepted, the device updates the channel number according to the station selection operation (terminal A; S705 in FIG. 7), and returns to the processing step S702 described above. This allows the program receiving display device 30 to switch from the second operational mode to the first operational mode to start receiving/reproducing the program content according to the updated channel number (S702). In short, the program receiving display device 30 selectively switches the program stream to be received to the one in the digital broadcasting service.

In addition, in the case where the program receiving display device 30 determines that a predetermined time-shifted reproduction operation by the viewer is accepted, the device starts the time-shifted reproduction processing (S1804). Since the time-shifted reproduction operation here is made during reception/reproduction of the actual-time program content in the IP broadcasting service, it is a time-shifted operation to go back to a point of time in the past, and is achieved by, for example, the viewer pressing the Fast-Rewind button FR or the Previous button PC on the remote controller RC. The processing of determining the reproduction start position is described in FIG. 9 described above, and so the description thereof will be omitted.

As described above, according to the present embodiment, in the case where the reproduction position of the program content during time-shifted reproduction in the VOD distribution service reaches the position in actual time, the program receiving display device 30 can switch from the VOD distribution service to the IP broadcasting service. This allows viewers to watch the program content in the IP broadcasting service as if it is the program content in actual time in the digital broadcasting service.

In the present embodiment, an aspect is described, as an example, in which switching is made from a VOD distribution service to an IP broadcasting service in the case where the reproduction position of the program content reaches the position in actual time due to the time-shifted reproduction operation by the viewer, but the present disclosure is not limited to such aspect. For example, as described above, the program receiving display device 30 may be configured to switch from a VOD distribution service to an IP broadcasting service in the case where the reproduction position of the program content in the VOD distribution service catches up with the position in actual time due to variable-speed reproduction during the time-shifted reproduction of such program content.

The above-described respective embodiments are illustrations for describing the present invention, and are not intended to limit the present invention only to these embodiments. The present invention may be implemented in various forms, as long as they do not deviate from the gist of the invention.

Further, the steps, actions, or functions in the method disclosed in the present specification may be implemented in parallel or in different order, unless there is no inconsistency in the results. The described steps, actions, and functions are provided as examples only and some of the steps, actions, and functions may be omitted and may be performed as one entity by being combined with each other, and other steps, actions, or functions may be added, to the extent that they do not deviate from the gist of the invention.

In addition, various embodiments are disclosed in the present specification, but specific features (technical matters) in one embodiment may be added to other embodiments with appropriate improvements, or may be replaced with specific features in such other embodiments, and such embodiments are also included in the gist of the present invention.

LIST OF REFERENCE SIGNS

1 . . . Program provision service system
10 . . . Broadcaster system
20 . . . Distribution provider system
30 . . . Program receiving display device
   31 . . . Main control unit
   32 . . . Broadcast program receiving reproduction unit
     321 . . . Tuner/modulation unit
     322 . . . Descrambling unit
     323 . . . Separation unit
     324 . . . Decoding unit
       3241 . . . Video decoding unit
       3242 . . . Subtitle decoding unit
       3243 . . . Audio decoding unit
   33 . . . IPTV program receiving reproduction unit
     331 . . . Communication interface unit
     332 . . . Streaming requesting unit
     333 . . . Streaming receiving processing unit
     334 . . . Separation unit
     335 . . . Decoding unit
       3351 . . . Video decoding unit
       3352 . . . Subtitle decoding unit
       3353 . . . Audio decoding unit
   34 . . . Output control unit
     341 . . . Display control unit
       3411 . . . Blending unit
       3412 . . . Display driver
       3413 . . . Buffering unit
     342 . . . Sound control unit 3421 . . . Audio driver
   35 . . . Operation accepting unit
   DSP . . . Display device
   SPK . . . Speaker
   RC . . . Remote controller
40 . . . Communication network

The invention claimed is:

1. A program receiving display device adapted for a digital broadcasting service and an IPTV service, comprising functionality for:

acquiring a first program stream based on a broadcast signal from a station selected according to a channel number from received broadcast waves; and sending a distribution request of a second program stream to a distribution server according to specific link information and acquiring the second program stream distributed under a simultaneous program distribution from the distribution server in response to the distribution request; and wherein the program receiving display device comprises a controller that performs control to select at least one of the first program stream or the second program stream, and to display a program content configured based on the selected program stream on a screen, wherein the controller performs control:

to switch an operational mode to at least one of a first operational mode in which the first program stream is selected or a second operational mode in which the second program stream is selected, for a current channel number, according to an operation of a viewer;

in case where a first time-shifted operation to go back to a point in time in a past is accepted from the viewer while a program content based on the first program stream is displayed on the screen in the first operational mode, to switch to the second operational mode to cause a program content based on the second program stream, the program content being the simultaneous program distribution of the first program stream, to be displayed on the screen; and in case where a second time-shifted operation is accepted from the viewer while the program content based on the second program stream is displayed on the screen in the second operation mode, to cause another program content in a distribution time zone different from a distribution time zone of the program content being displayed to be displayed on the screen.

2. The program receiving display device according to claim 1, further comprising functionality for acquiring the program stream corresponding to the program content for a current channel number.

3. The program receiving display device according to claim 1, wherein the controller performs control, in the first operational mode, to display the program content based on the first program stream on the screen at a reproduction position in actual time on a time axis, and in the second operational mode, to display the program content based on the second program stream on the screen at a reproduction position at a point of time in the past on the time axis.

4. The program receiving display device according to claim 3, wherein the controller performs control, in the second operational mode, to display the program content based on the second program stream on the screen at a reproduction speed different from a reproduction speed in the actual time.

5. The program receiving display device according to claim 4, wherein, in the case where the reproduction position of the program content at a point of time in the past reaches a reproduction position in the actual time, the controller switches to the first operational mode.

6. The program receiving display device according to claim 1, wherein, in the case where a channel number different from the current channel number is selected, the controller switches to the first operational mode.

7. The program receiving display device according to claim 1, further comprising functionality for acquiring the second program stream from a point of time in the past identified according to the viewer's operation, in accordance with the specific link information associated with the program content.

8. The program receiving display device according to claim 1, wherein the controller switches to a third operational mode according to the viewer's operation, and the controller performs control, in the third operational mode, to display the program content based on the first program stream in a first frame in the screen at a reproduction position in actual time, and to display the program content based on the second program stream in a second frame, different from the first frame, at a reproduction position at a point of time in the past.

9. The program receiving display device according to claim 1, wherein the controller performs control, in the second operational mode, to superimpose an indicator indicating the IPTV service on the program content based on the selected second program stream.

10. The program receiving display device according to claim 1, further comprising functionality for sending a VOD distribution request and receiving the second program stream streamed by unicast from the distribution server in response to the VOD distribution request.

11. The program receiving display device according to claim 10, further comprising functionality for sending an IP distribution request in lieu of the VOD distribution request, in the case where a reproduction position of the program content based on the second program stream reaches a reproduction position in actual time, and receiving the second program stream streamed by multicast from the distribution server in response to the IP distribution request.

12. A program receiving display control method by a program receiving display device adapted for a digital broadcasting service and an IPTV service, comprising:

acquiring a first program stream based on a broadcast signal from a station selected according to a channel number from received broadcast waves;

sending a distribution request of a second program stream to a distribution server indicated by specific link information and acquiring the second program stream distributed under a simultaneous program distribution from the distribution server in response to the distribution request; and performing control to select at least one of the first program stream or the second program stream and to display a program content configured based on the selected program stream on a screen, wherein the performing control comprises:

selecting the first program stream in a first operational mode; and selecting the second program stream in a second operational mode, in a case where a first time-shifted operation to go back to a point in time in a past is accepted from a viewer while a program content based on the first program stream selected in the first operational mode is displayed on the screen, to cause a program content based on the second program stream, the program content being the simultaneous program distribution of the first program stream, to be displayed on the screen; and in a case where a second time-shifted operation is accepted from the viewer while the program content based on the second program stream is displayed on the screen in the second operation mode, to cause another program content in a distribution time zone different from a distribution time zone of the program content being displayed to be displayed on the screen.

13. The program receiving display device according to claim 1, wherein the first program stream is associated with the digital broadcasting service, and wherein the second program stream is associated with the IPTV service.

14. The program receiving display control method of claim 12, wherein the first program stream is associated with the digital broadcasting service, and wherein the second program stream is associated with the IPTV service.

* * * * *